(12) United States Patent
Maruyama

(10) Patent No.: US 11,524,327 B2
(45) Date of Patent: Dec. 13, 2022

(54) DEVICE FOR MANUFACTURING LAMINATED IRON CORE AND METHOD FOR MANUFACTURING LAMINATED IRON CORE

(71) Applicant: MITSUI HIGH-TEC, INC., Fukuoka (JP)

(72) Inventor: Takashi Maruyama, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 281 days.

(21) Appl. No.: 16/997,322

(22) Filed: Aug. 19, 2020

(65) Prior Publication Data

US 2021/0060635 A1 Mar. 4, 2021

(30) Foreign Application Priority Data

Sep. 3, 2019 (JP) .............................. JP2019-160461

(51) Int. Cl.
 *B21D 28/22* (2006.01)
 *B21D 28/04* (2006.01)
 (Continued)

(52) U.S. Cl.
 CPC ............ *B21D 28/22* (2013.01); *B21D 28/04* (2013.01); *B21D 28/06* (2013.01); *B21D 28/20* (2013.01); *B21D 28/14* (2013.01); *B21D 28/16* (2013.01)

(58) Field of Classification Search
 CPC ........ B21D 28/04; B21D 28/06; B21D 28/22; B21D 28/14; B21D 28/16; B21D 28/20;
 (Continued)

(56) References Cited

U.S. PATENT DOCUMENTS

| 4,110,895 A | * | 9/1978 | Mitsui | ...................... H02K 1/26 |
| | | | | 29/736 |
| 4,738,020 A | * | 4/1988 | Neuenschwander | ........................ |
| | | | | H02K 15/024 |
| | | | | 29/598 |

(Continued)

FOREIGN PATENT DOCUMENTS

| CN | 203883632 | 10/2014 |
| JP | 2007-181297 | 7/2007 |

(Continued)

*Primary Examiner* — Edward T Tolan
(74) *Attorney, Agent, or Firm* — Procopio, Cory, Hargreaves & Savitch LLP

(57) ABSTRACT

A device for manufacturing a laminated iron core includes: a punch unit configured to form protrusions, and including N number of punches as a set, the N being a natural number larger than M; and N number of auxiliary punches. The N number of auxiliary punches are configured such that L number of auxiliary punches selected from the N number of auxiliary punches performs a nullification processing on a metal sheet, the nullification processing being configured to nullify a processing with the L number of punches among the N number of punches, the L being the natural number that is obtained by subtracting the M from the N. According to the above configurations, for example, since a processing position with the plurality of punches is limited in one position, a positional accuracy of protrusions formed in punched members with the plurality of punches is improved.

10 Claims, 13 Drawing Sheets

(51) Int. Cl.
*B21D 28/06* (2006.01)
*B21D 28/20* (2006.01)
*B21D 28/14* (2006.01)
*B21D 28/16* (2006.01)

(58) Field of Classification Search
CPC ... H02K 15/024; H02K 15/03; H01F 41/0233
See application file for complete search history.

(56) References Cited

U.S. PATENT DOCUMENTS

| | | | |
|---|---|---|---|
| 5,799,387 A * | 9/1998 | Neuenschwander | B21D 35/00 29/598 |
| 5,915,750 A * | 6/1999 | Usher | H02K 3/28 29/564.6 |
| 5,960,533 A * | 10/1999 | Neuenschwander | H02K 15/024 29/330 |
| 6,237,214 B1 * | 5/2001 | Neuenschwander | B21D 28/22 29/598 |
| 8,361,269 B2 * | 1/2013 | Sakakibara | H02K 15/024 156/252 |
| 10,040,111 B2 * | 8/2018 | Arima | H01F 41/0233 |
| 11,355,282 B2 * | 6/2022 | Okudaira | H01F 3/04 |
| 2011/0024489 A1 | 2/2011 | Sakakibara et al. | |
| 2011/0277939 A1 * | 11/2011 | Hirata | H02K 15/02 156/513 |
| 2015/0002141 A1 | 1/2015 | Ochiai | |
| 2017/0257010 A1 | 9/2017 | Ochiai | |

FOREIGN PATENT DOCUMENTS

| | | |
|---|---|---|
| JP | 5469759 | 4/2014 |
| JP | 2015-107013 | 6/2015 |
| JP | 2018-7530 A | 1/2018 |
| JP | 2019-54727 | 4/2019 |

\* cited by examiner

DEVICE FOR MANUFACTURING LAMINATED IRON CORE AND METHOD FOR MANUFACTURING LAMINATED IRON CORE

CROSS-REFERENCE TO RELATED APPLICATIONS

This application is based on and claims priority under 35 USC 119 from Japanese Patent Application No. 2019-160461 filed on Sep. 3, 2019, the contents of which are incorporated herein by reference.

TECHNICAL FIELD

The present disclosure relates to a device for manufacturing a laminated iron core and a method for manufacturing a laminated iron core.

BACKGROUND ART

JP2018-007530A discloses a method for manufacturing a rotor laminated iron core in which a strip-shaped metal sheet is sent intermittently, an inner diameter region is punched from each metal sheet, a plurality of shaft holes provided with key protruding portions is formed such that the protruding portions face different angles; an outer diameter region including each shaft hole is separately punched from the metal sheet to form a plurality of punched members; and a plurality of the punched members are laminated while being rotated such that the protruding portions overlap with each other.

According to the method described in JP2018-007530A, in order to form the plurality of shaft holes such that the protruding portions each face different angles, a plurality of punches for forming the shaft holes are arranged in a line in a longitudinal direction of the metal sheet. Therefore, if the punches are not accurately aligned, the protruding portions may be displaced in a height direction of the rotor laminated iron core when the plurality of punched members are laminated.

According to the method described in JP2018-007530A, the shaft hole is formed by one punch, so that the punch includes a first portion corresponding to the protruding portion, and a second portion corresponding to an opening portion of the shaft hole. Since the protruding portion has a relatively complicated shape such as an uneven shape, the first portion tends to be damaged relatively easily. When the first portion is damaged, the entire punch including the second portion needs to be replaced, which may increase the maintenance cost.

SUMMARY OF INVENTION

The present disclosure describes a device for manufacturing a laminated iron core and a method for manufacturing a laminated iron core with which a laminated iron core can be manufactured with high accuracy and low cost.

According to an illustrative aspect of the present disclosure, a device for manufacturing a laminated iron core by punching out a plurality of punched members from a metal sheet and laminating the plurality of punched members while being rotated, the plurality of punched members having an annular shape and having M number of protrusions provided on an inner peripheral edge or an outer peripheral edge of the plurality of punched members, the M being a natural number of 1 or more, includes: a punch unit configured to form the protrusions, and including N number of punches as a set, the N being the natural number larger than the M; and N number of auxiliary punches. The N number of auxiliary punches are configured such that L number of auxiliary punches selected from the N number of auxiliary punches performs a nullification processing on the metal sheet, the nullification processing being configured to nullify a processing with the L number of punches among the N number of punches, the L being the natural number that is obtained by subtracting the M from the N.

According to another illustrative aspect of the present disclosure, a method for manufacturing a laminated iron core by punching out a plurality of punched members from a metal sheet and laminating the plurality of punched members while being rotated, the plurality of punched members having an annular shape and having M number of protrusions provided on an inner peripheral edge or an outer peripheral edge of the plurality of punched members, the M being a natural number of 1 or more, includes: processing the metal sheet with a punch unit of forming the protrusions, and including N number of punches as a set, the N being a natural number larger than the M; and performing a nullification processing on the metal sheet with L number of auxiliary punches selected from the N number of auxiliary punches so as to nullify a processing with the L number of punches among the N number of punches, the L being the natural number that is obtained by subtracting the M from the N.

According to the device for manufacturing a laminated iron core and the method for manufacturing a laminated iron core of the present disclosure, a laminated iron core can be manufactured with high accuracy and low cost.

DESCRIPTION OF EMBODIMENTS

Figure 1:
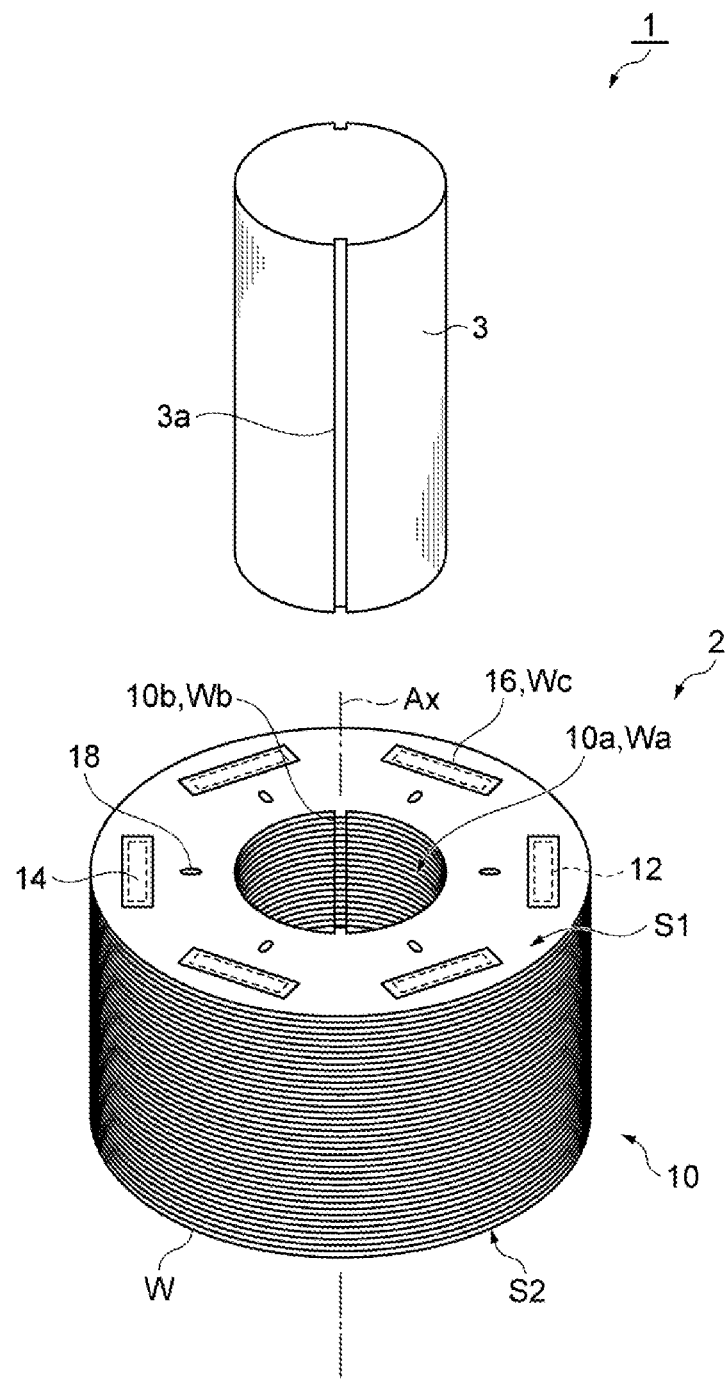
FIG. 1 is an exploded perspective view showing an example of a rotor.

Hereinafter, an example of an embodiment according to the present disclosure will be described in more detail with reference to the drawings. In the following description, the same elements or elements having the same functions will be denoted by the same reference numerals, and repetitive descriptions thereof will be omitted.

[Configuration of Rotor]

First, the configuration of a rotor 1 (rotor) will be described with reference to FIG. 1. The rotor 1 is combined with a stator (stator) to form an electric motor (motor). The rotor 1 may form a part of an embedded magnet type (IPM) motor, or may form a part of another type of motor, for example. The rotor 1 includes a rotor laminated iron core 2 (laminated iron core) and a shaft 3.

The rotor laminated iron core 2 includes a laminated body 10 (laminated iron core), a plurality of permanent magnets 12, and a plurality of solidified resins 14.

The laminated body 10 has a cylindrical shape. An shaft hole 10a penetrating the laminated body 10 is provided in a central portion of the laminated body 10. The shaft hole 10a extends along a center axis Ax. The shaft hole 10a extends in a height direction (upper-lower direction) of the laminated body 10. Since the laminated body 10 rotates around the center axis Ax, the center axis Ax is also a rotation axis.

At least one protruding ridge 10b is provided on an inner peripheral surface of the shaft hole 10a. The protruding ridge 10b extends in the height direction from an upper end surface S1 to a lower end surface S2 of the laminated body 10. The protruding ridge 10b protrudes from the inner peripheral surface of the shaft hole 10a toward the center axis Ax. The number of the protruding ridges 10b may be two. In this case, the two protruding ridges 10b may be arranged so as to face each other with the center axis Ax therebetween.

A plurality of magnet-insert holes 16 are formed in the laminated body 10. The magnet-insert holes 16 are arranged at predetermined intervals along an outer peripheral edge of the laminated body 10. The magnet-insert holes 16 penetrate the laminated body 10 in a manner of extending along the center axis Ax. That is, the magnet-insert holes 16 extend in the height direction.

The laminated body 10 is configured by laminating a plurality of punched members W. The punched members W are plate-shaped body formed by punching a metal sheet MS (for example, electromagnetic steel plate) described below into predetermined shapes, so as to form a shape corresponding to the laminated body 10. That is, the punched members W have an annular shape as a whole, and include a center hole Wa corresponding to the shaft hole 10a, a protrusion Wb corresponding to the protruding ridge 10b, and a through hole Wc corresponding to the magnet-insert hole 16. That is, at least one protrusion Wb is provided on an inner peripheral edge of the punched members W.

The laminated body 10 may be configured by so-called rotating lamination. The term "rotating lamination" refers to laminating a plurality of punched members W while relatively shifting angles of the punched members W. The rotating lamination is performed mainly for the purpose of offsetting the plate thickness deviation of the punched members W and increasing the flatness, parallelism, and perpendicularity of the laminated body 10. The angles of the rotating lamination may be set to any size.

The punched members W adjacent to each other in the laminating direction may be interlocked by a caulk portion 18. The punched members W may also be interlocked to each other by various known methods instead of the caulk portion 18. For example, the plurality of punched members W may be joined together through using an adhesive or a resin material, or may be joined together by welding.

One permanent magnet 12 is inserted into each magnet-insert hole 16. A shape of the permanent magnet 12 is not particularly limited, and the permanent magnet 12 may have a rectangular parallelepiped shape. A type of the permanent magnet 12 may be determined according to the use, the required performance, and the like of the motor, and may be, for example, a sintered magnet or a bonded magnet.

The solidified resin 14 is obtained by solidifying a resin material in a molten state (molten resin) filled in the magnet-insert hole 16 in which the permanent magnet 12 is housed. The solidified resin 14 may be configured to fix the permanent magnet 12 in the magnet-insert hole 16. The solidified resin 14 may be configured to bond the punched members W adjacent to each other in the upper-lower direction.

The shaft 3 has a cylindrical shape as a whole. The shaft 3 is formed with a pair of concave grooves 3a. The concave groove 3a extends along the longitudinal direction of the shaft 3 from one end to the other end of the shaft 3. The shaft 3 is inserted into the shaft hole 10a. In a state where the shaft 3 is inserted into the shaft hole 10a, the protruding ridges 10b engage with the concave grooves 3a. Accordingly, the shaft 3 is fixed to the rotor laminated iron core 2, and a rotational force is transmitted between the shaft 3 and the rotor laminated iron core 2.

[Configuration of Device for Manufacturing Laminated Iron Core]

Figure 2:
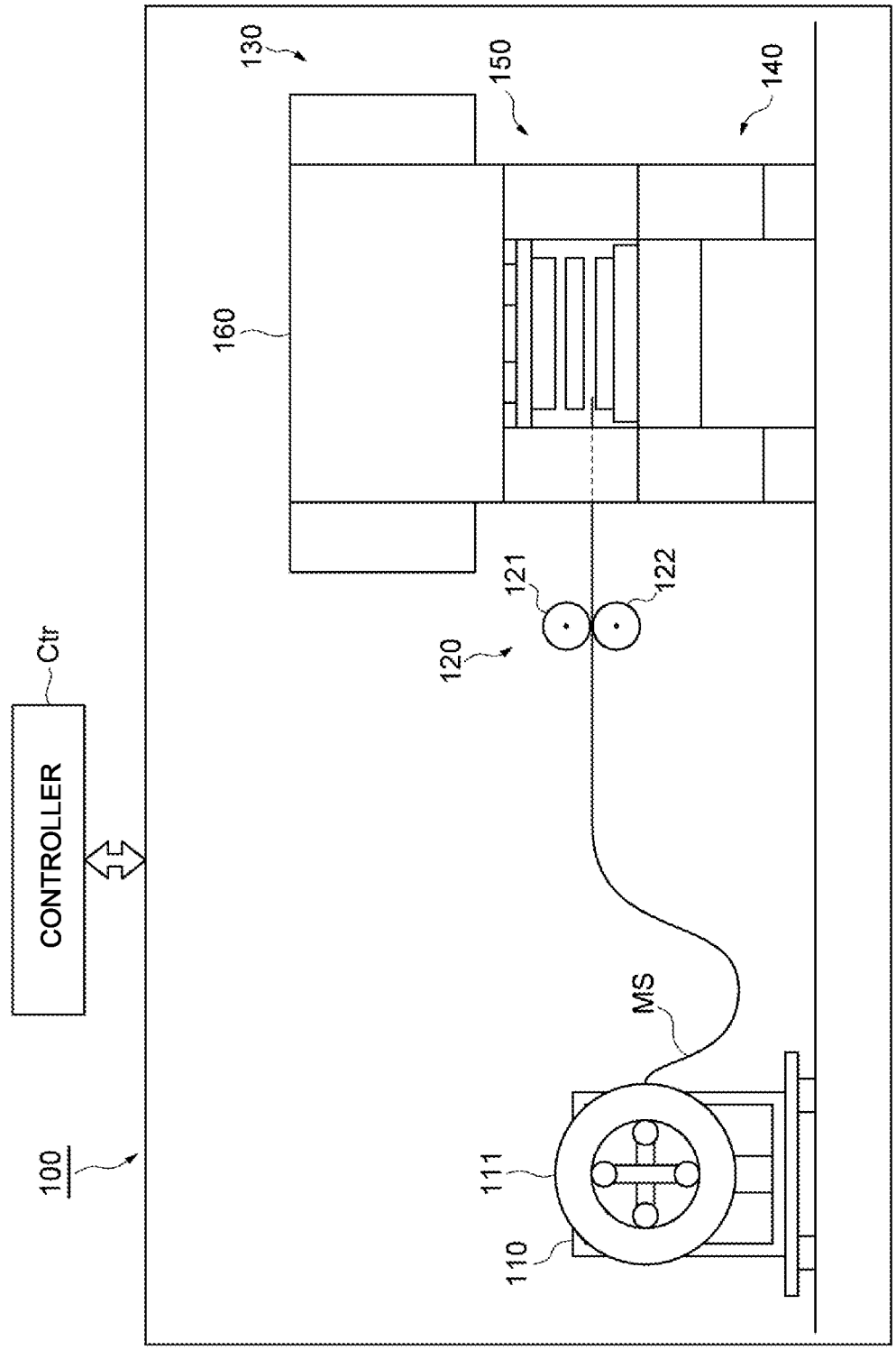
FIG. 2 is a schematic view showing an example of a device for manufacturing a laminated iron core.

Next, a manufacturing device 100 of a laminated iron core will be described with reference to FIG. 2. The manufacturing device 100 is configured to manufacture the laminated body 10 from the strip-shaped metal sheet MS. As shown in FIG. 2, the manufacturing device 100 includes an uncoiler 110, a feeding device 120, a press processing device 130, and a controller Ctr (control unit).

The uncoiler 110 is configured to rotatably hold a coil material 111. The coil material 111 is a metal sheet MS wound in a coil shape (spiral shape). The feeding device 120 includes a pair of rollers 121, 122 sandwiching the metal sheet MS from an upper side and a lower side. The pair of rollers 121, 122 rotate and stop based on an instruction signal from the controller Ctr, and intermittently and sequentially feed the metal sheet MS to the press processing device 130.

The press processing device 130 is configured to operate based on an instruction signal from the controller Ctr. The press processing device 130 may be configured to sequentially punch the metal sheet MS fed by the feeding device 120 with a plurality of punches, so as to form a plurality of punched members W, for example. The press processing device 130 may be configured to sequentially laminate the plurality of punched members W obtained by punching, so as to form the laminated body 10. The configuration of the press processing device 130 will be described later.

The controller Ctr is configured to generate an instruction signal for operating the feeding device 120 and the press processing device 130 based on a program recorded in a recording medium (not shown) or an operation input from an operator, for example. The controller Ctr is configured to send the instruction signal to the feeding device 120 and the press processing device 130, separately.

[Details of Press Processing Device]

Figure 3:
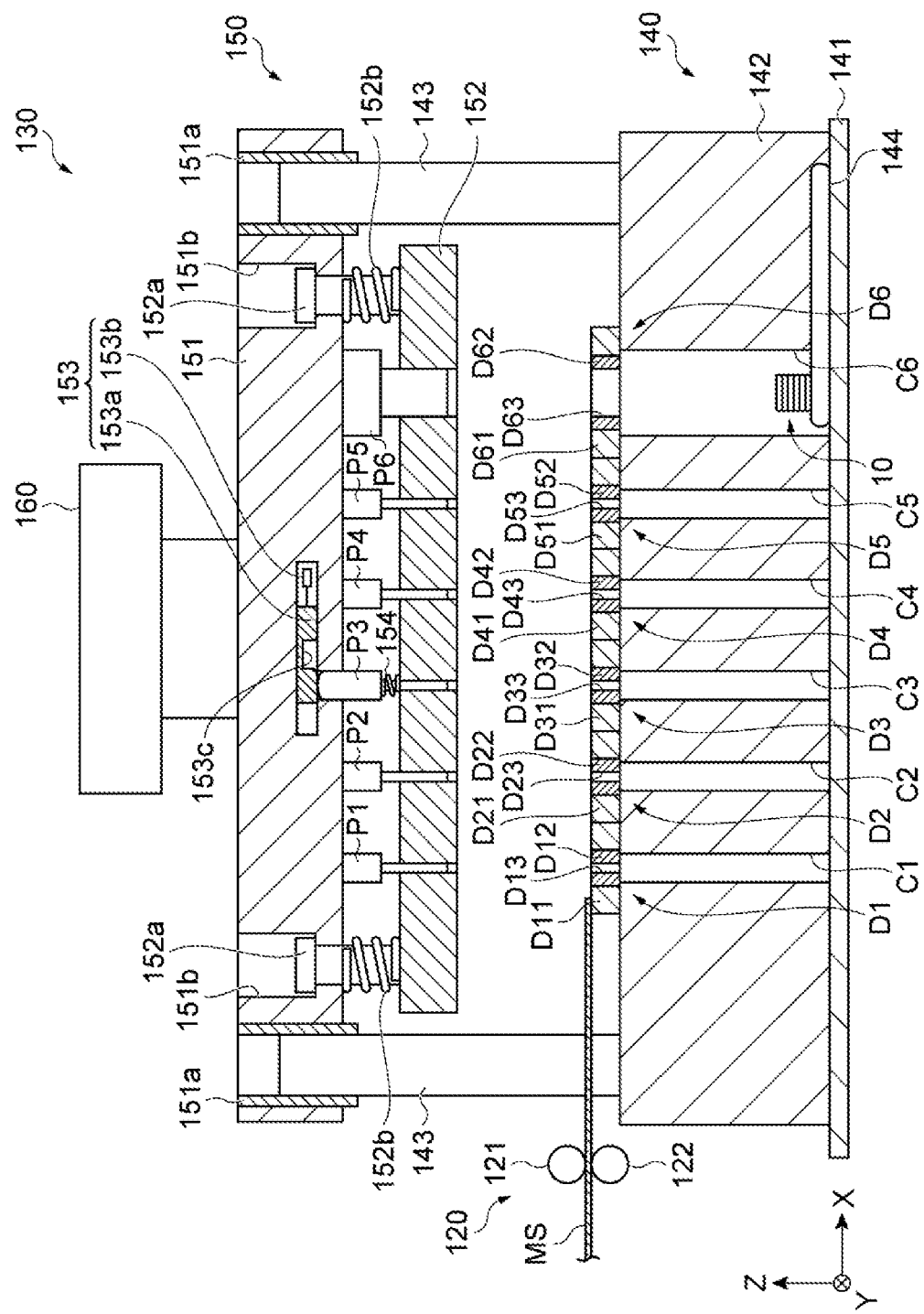
FIG. 3 is a schematic sectional view showing an example of a press processing device.

Next, the details of the press processing device 130 will be described with reference to FIGS. 3 and 4. As shown in FIG. 3, the press processing device 130 includes a lower die 140, an upper die 150, and a pressing machine 160. The lower die 140 includes a base 141, a die holder 142, die members D1 to D6, a plurality of guide posts 143, and a transport mechanism 144.

The base 141 is fixed on a floor surface, for example, and functions as a base of the entire press processing device 130. The die holder 142 is supported on the base 141. The die holder 142 is formed with a plurality of discharge holes C1 to C6. The die holder 142 may be made of, for example, a steel material (raw material) that has not been subjected to heat treatment such as quenching.

The plurality of discharge holes C1 to C6 may extend inside the die holder 142 in the upper-lower direction (see arrow Z in FIG. 3). The material punched out from the metal sheet MS (for example, the punched member W, waste material or the like) is discharged to the plurality of discharge holes C1 to C6.

The die members D1 to D6 are attached to an upper portion of the die holder 142 so as to be adjacent to each other in a transport direction of the metal sheet MS. The plurality of die members D1 to D6 are arranged in this order from the upstream side to the downstream side in the transport direction of the metal sheet MS.

The die member D1 includes a die plate D11 and a die D12. The die plate D11 is configured to hold the die D12 in a through hole provided in a central portion. The die plate D11 may be made of, for example, a steel material that has been subjected to heat treatment such as quenching. The die D12 may be made of, for example, a cemented carbide containing tungsten carbide.

Figure 4:
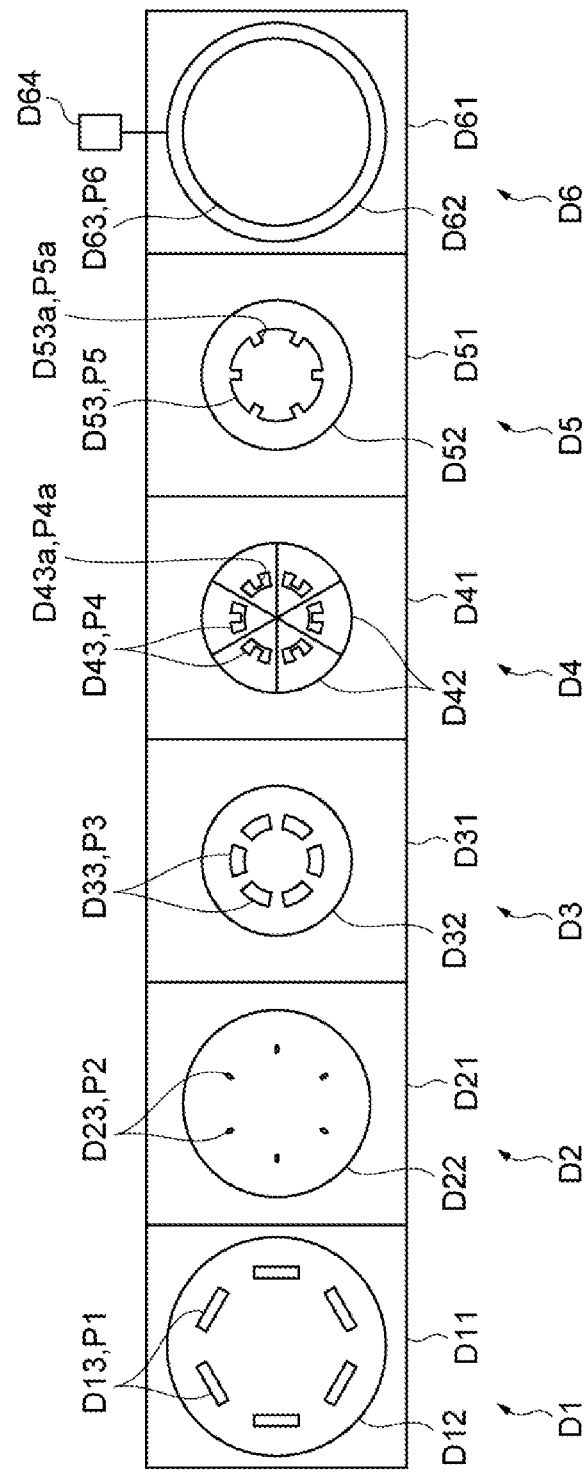
FIG. 4 is a top view schematically showing an example of a punch included in the press processing device.

As shown in FIGS. 3 and 4, the die D12 is formed with a die hole D13 penetrating in the upper-lower direction. The die hole D13 configures a unit for punching the metal sheet MS together with a punch P1 described later. The through hole We corresponding to the magnet-insert hole 16 may be formed in the metal sheet MS by punching the metal sheet MS with the unit.

The die hole D13 may have a shape corresponding to the magnet-insert hole 16, or may have a rectangular shape or the like. The number of die holes D13 may be the same as the number of magnet-insert holes 16 formed in the laminated body 10. As illustrated in FIG. 4, the plurality of die holes D13 may be arranged at substantially equal intervals so as to form a circular shape as a whole.

Returning to FIG. 3, the die holes D13 communicate with the discharge hole C1. By inserting and removing the punch P1 in and from the die hole D13, the metal sheet MS is punched in a shape along a contour of the die hole D13. A metal piece punched out from the metal sheet MS is discharged to the outside of the press processing device 130 through the discharge hole C1.

The die member D2 includes a die plate D21 and a die D22. The die plate D21 is configured to hold the die D22 in a through hole provided in a central portion. The material of the die plate D21 may be the same as the material of the die plate D11, and the material of the die D22 may be the same as the material of the die D12.

As shown in FIGS. 3 and 4, the die D22 is formed with a die hole D23 penetrating in the upper-lower direction. The die hole D23 configures a unit for half punching or punching the metal sheet MS together with a punch P2 described later. In the case of half punching, the punch P2 may press the metal sheet MS into the die hole D23 to an extent that the metal sheet MS is not punched, so as to form an unevenness corresponding to the caulk portion 18 on the metal sheet MS. In the case of punching, the punch P2 may punch the metal sheet MS, so as to form a through hole corresponding to the caulk portion 18 in the metal sheet MS.

The die hole D23 may have a shape corresponding to the caulk portion 18, or may have a circular shape, a rectangular shape, or the like. The number of die holes D23 may be the same as the number of caulk portion 18 formed in the laminated body 10. As illustrated in FIG. 4, the plurality of die holes D23 may be arranged at substantially equal intervals so as to form a circular shape as a whole.

Returning to FIG. 3, the die holes D23 communicate with the discharge hole C2. By inserting and removing the punch P2 in the die hole D23, the metal sheet MS is half punched or punched in a shape along a contour of the die hole D23. A metal piece punched out from the metal sheet MS is discharged to the outside of the press processing device 130 through the discharge hole C2.

The die member D3 includes a die plate D31 and a die D32. The die plate D31 is configured to hold the die D32 in a through hole provided in a central portion. The material of the die plate D31 may be the same as the material of the die plate D11, and the material of the die D32 may be the same as the material of the die D12.

As shown in FIGS. 3 and 4, the die D32 is formed with a die hole D33 penetrating in the upper-lower direction. The die hole D33 configures a unit for punching the metal sheet MS together with a punch P3 described later. A part of the center hole Wa may be formed in the metal sheet MS by punching the metal sheet MS with the unit.

The die hole D33 may be located inside a region where the center hole Wa of the punched member W is to be formed in the metal sheet MS. The die hole D33 may have, for example, an annular sector shape. The number of die holes D33 may be set according to an angle of the rotating lamination. For example, when the angle of the rotating lamination is 180°, the number of die holes D33 may be two; when the angle of the rotating lamination is 120°, the number of die holes D33 may be three; when the angle of the rotating lamination is 90°, the number of die holes D33 may be four; when the angle of the rotating lamination is 60°, the number of die holes D33 may be six; and when the angle of the rotating lamination is 45°, the number of die holes D33 may be eight. As illustrated in FIG. 4, the plurality of die holes D23 may be arranged at substantially equal intervals so as to form a circular shape as a whole.

Returning to FIG. 3, the die holes D33 communicate with the discharge hole C3. By inserting and removing the punch P3 in the die hole D33, the metal sheet MS is punched in a shape along a contour of the die hole D33. A metal piece punched out from the metal sheet MS is discharged to the outside of the press processing device 130 through the discharge hole C3.

The die member D4 includes a die plate D41 and a die D42. The die plate D41 is configured to hold the die D42 in a through hole provided in a central portion. The material of the die plate D41 may be the same as the material of the die plate D11, and the material of the die D42 may be the same as the material of the die D12.

As shown in FIGS. 3 and 4, the die D42 is formed with a die hole D43 penetrating in the upper-lower direction. The die hole D43 configures a unit for punching the metal sheet MS together with a punch P4 described later. The protrusion Wb may be formed in the metal sheet MS by punching the metal sheet MS with the unit.

The die hole D43 may be located inside a region where the center hole Wa of the punched member W is to be formed in the metal sheet MS. The die hole D43 may have, for example, an annular sector shape as a whole. The die hole D43 may be provided with a protruding ridge D43a protruding from an outer side to an inner side on the outer peripheral edge. The number of the die holes D43 may be the same as that of the die holes D33. As illustrated in FIG. 4, the plurality of die holes D23 may be arranged at substantially equal intervals so as to form a circular shape as a whole. As illustrated in FIG. 4, the die member D4 may include a plurality of dies D42, and one die hole D43 may be formed in each of the plurality of dies D42 respectively. In this case, the plurality of dies D42 may be held in the through hole of the die plate D41 so as to be arranged in a circular shape as a whole.

Returning to FIG. 3, the die holes D43 communicate with the discharge hole C4. By inserting and removing the punch P4 in the die hole D43, the metal sheet MS is punched in a shape along a contour of the die hole D43. A metal piece punched out from the metal sheet MS is discharged to the outside of the press processing device 130 through the discharge hole C4.

The die member D5 includes a die plate D51 and a die D52. The die plate D51 is configured to hold the die D52 in a through hole provided in a central portion. The material of the die plate D51 may be the same as the material of the die plate D11, and the material of the die D52 may be the same as the material of the die D12.

As shown in FIGS. 3 and 4, the die D52 is formed with a die hole D53 penetrating in the upper-lower direction. The die hole D53 configures a unit for punching the metal sheet MS together with a punch P5 described later. The remaining part of the center hole Wa may be formed in the metal sheet MS by punching the metal sheet MS with the unit.

The die hole D53 may have, for example, a circular shape as a whole. The die hole D53 may be provided with a protruding ridge D53a protruding from a peripheral edge toward the center on the peripheral edge. The number of the protruding ridges D53a may be the same as that of the die holes D33, D43. As illustrated in FIG. 4, the plurality of protruding ridges D53a may be arranged at substantially equal intervals in a circumferential direction of the die hole D53.

Returning to FIG. 3, the die holes D53 communicate with the discharge hole C5. By inserting and removing the punch P5 in the die hole D53, the metal sheet MS is punched in a shape along a contour of the die hole D53. A metal piece punched out from the metal sheet MS is discharged to the outside of the press processing device 130 through the discharge hole C5.

The die member D6 includes a die plate D61, a die D62, and a drive mechanism D64. The die plate D61 is configured to hold the die D62 in a through hole provided in a central portion. The die D62 may be held with respect to the die plate D61 so as to be rotatable about a center axis extending along a vertical direction. A die holder may be interposed between the die plate D61 and the die D62, and the die holder may be rotatably held with respect to the die plate D61. The material of the die plate D61 may be the same as the material of the die plate D11, and the material of the die D62 may be the same as the material of the die D12.

As shown in FIGS. 3 and 4, the die D62 is formed with a die hole D63 penetrating in the upper-lower direction. The die hole D63 configures a unit for punching the metal sheet MS together with a punch P6 described later. The punched member W may be formed in the metal sheet MS by punching the metal sheet MS with the unit. The die hole D63 may have, for example, a circular shape as a whole.

Returning to FIG. 3, the die holes D63 communicate with the discharge hole C6. By inserting and removing the punch P6 in the die hole D63, the metal sheet MS is punched in a shape along a contour of the die hole D63. The punched member W punched out from the metal sheet MS is laminated on a punched member W punched out previously, while being interlocked to each other by the caulk portion 18 in the die hole D63. When a predetermined number of punched members W are laminated in the die hole D63, the obtained laminated body 10 is placed on the transport mechanism 144 through the discharge hole C6.

The drive mechanism D64 is connected to the die D62. The drive mechanism D64 rotates the die D62 around the center axis of the die D62 based on the instruction signal from the controller Ctr. Therefore, after the punched member W punched out from the metal sheet MS is laminated on the punched member W punched out previously, the die D62 is rotated by a predetermined angle, so that the succeeding punched member W is laminated on and rotated with respect to the preceding punched member W. The drive mechanism D64 may be implemented by, for example, a combination of a rotary motor, gears, a timing belt, or the like.

As shown in FIG. 3, the plurality of guide posts 143 linearly extend upward from the die holder 142. The plurality of guide posts 143, together with guide bushes 151a (to be described later), are configured to guide the upper die 150 in the upper-lower direction. The plurality of guide posts 143 may be attached to the upper die 150 so as to extend downward from the upper die 150.

The transport mechanism 144 is configured to operate based on an instruction from the controller Ctr and send the laminated body 10 dropped from the die D62 to a subsequent device (for example, a magnet attachment device, a resin injection device, a welding device, a shaft attachment device or the like). The transport mechanism 144 is disposed such that one end of the transport mechanism 144 is located inside the discharge hole C6, and the other end of the transport mechanism 144 is located outside the press processing device 130. The transport mechanism 144 may be, for example, a belt conveyor.

The upper die 150 includes a punch holder 151, a stripper 152, a plurality of punches P1 to P6, and a switching device 153. The punch holder 151 is arranged above the die holder 142 so as to face the die holder 142. The punch holder 151 is configured to hold the plurality of punches P1 to P6 on a lower surface side thereof.

The punch holder 151 is provided with a plurality of guide bushes 151a. The plurality of guide bushes 151a are located so as to correspond to the plurality of guide posts 143, respectively. The guide bush 151a has a cylindrical shape, and the guide post 143 can be inserted into an internal space of the guide bush 151a. When the guide post 143 is attached to the upper die 150, the guide bush 151a may be provided on the lower die 140.

The punch holder 151 is provided with a plurality of through holes 151b. A step-like step is formed on an inner peripheral surface of the through hole 151b. Therefore, a diameter of an upper portion of the through hole 151b is set smaller than a diameter of a lower portion of the through hole 151b.

The stripper 152 is configured to remove from the punches P1 to P6 the metal sheet MS that is punched into the punches P1 to P6 when the metal sheet MS is punched with the punches P1 to P6. The stripper 152 is arranged between the die members D1 to D6 and the punch holder 151.

The stripper 152 is connected to the punch holder 151 via a connecting member 152a. The connecting member 152a includes an elongated main body portion and a head portion provided on an upper end of the main body portion. The main body portion of the connecting member 152a is inserted into the lower portion of the through hole 151b and can move up and down in the through hole 151b. A lower end of the main body portion of the connecting member 152a is fixed to the stripper 152. A biasing member 152b such as a compression coil spring may be attached around the main body portion of the connecting member 152a so as to be located between the punch holder 151 and the stripper 152.

The head portion of the connecting member 152a is arranged on the upper portion of the through hole 151b. An outer shape of the head portion of the connecting member 152a is set to be larger than an outer shape of the main body portion of the connecting member 152a when viewed from above. Therefore, the head portion of the connecting member 152a can move up and down in the upper portion of the through hole 151b, but the step of the through hole 151b functions as a stopper and cannot move to the lower portion of the through hole 151b. Therefore, the stripper 152 is suspended and held by the punch holder 151 so as to be movable up and down relative to the punch holder 151.

The stripper 152 is provided with through holes at positions corresponding to punches P1 to P6, respectively. Each through hole extends in the upper-lower direction. Each of the through holes communicates with the corresponding die holes D13 to D63 when viewed from above. Lower portions of the punches P1 to P6 are inserted into the respective through holes. The lower portions of the punches P1 to P6 are slidable in the respective through holes.

The punches P1 to P6 are arranged in this order from the upstream side to the downstream side of the press processing device 130. A lower end portion of the punch P1 has a shape corresponding to the die hole D13. The lower end portion may be, for example, a columnar body having a rectangular cross section. The number of the punches P1 may be the same as that of the die holes D13. As illustrated in FIG. 4, the plurality of punches P1 may be arranged at substantially equal intervals so as to form a circular shape as a whole.

When the press processing device 130 includes a plurality of punches P1, the plurality of punches P1 may form a set of punch unit for forming the through holes We corresponding to the magnet-insert holes 16. That is, the plurality of punches P1 may be configured to punch the metal sheet MS at substantially the same time in the same punching process.

A lower end portion of the punch P2 has a shape corresponding to the die hole D23. The lower end portion may be, for example, a columnar body having a circular cross section or a rectangular cross section. The number of the punches P2 may be the same as that of the die holes D23. As illustrated in FIG. 4, the plurality of punches P2 may be arranged at substantially equal intervals so as to form a circular shape as a whole.

When the press processing device 130 includes a plurality of punches P2, the plurality of punches P2 may form a set of punch unit for forming the through holes or the unevenness corresponding to the caulk portions 18. That is, the plurality of punches P2 may be configured to half punch or punch the metal sheet MS at substantially the same time in the same punching process. The switching between the half-punching and the punching by the plurality of punches P2 may be performed by a device similar to the switching device 153.

A lower end portion of the punch P3 (auxiliary punch) has a shape corresponding to the die hole D33. The lower end portion may be, for example, a columnar body having an annular sector-shaped cross section. The number of the punches P3 may be the same as that of the die holes D33. As illustrated in FIG. 4, the plurality of punches P3 may be arranged at substantially equal intervals so as to form a circular shape as a whole. A biasing member 154 such as a compression coil spring may be attached around a lower end portion of the punch P3 so as to be located between the head portion of the punch P3 and the stripper 152.

When the press processing device 130 includes a plurality of punches P3, the plurality of punches P3 may form a set of punch unit (auxiliary punch unit) for forming the part of the center hole Wa. That is, the plurality of punches P3 may be configured to punch the metal sheet MS at substantially the same time in the same punching process.

A lower end portion of the punch P4 has a shape corresponding to the die hole D43. The lower end portion may be, for example, a columnar body having an annular sector-shaped cross section. At least an outer peripheral surface of the lower end portion of the punch P4 may be provided with, for example, a concave groove P4a extending in the upper-lower direction. The number of the punches P4 may be the same as that of the die holes D43. As illustrated in FIG. 4, the plurality of punches P4 may be arranged at substantially equal intervals so as to form a circular shape as a whole.

When the press processing device 130 includes a plurality of punches P4, the plurality of punches P4 may form a set of punch unit (punch unit for forming protrusion) for forming the protrusions Wb. That is, the plurality of punches P4 may be configured to punch the metal sheet MS at substantially the same time in the same punching process.

A lower end portion of the punch P5 has a shape corresponding to the die hole D53. The lower end portion may be, for example, a columnar body having a circular cross section as a whole. At least an outer peripheral surface of the lower end portion of the punch P5 may be provided with, for example, a concave groove P5a extending in the upper-lower direction. The number of the concave grooves P5a may be the same as that of the die holes D33, D43. As illustrated in FIG. 4, the plurality of concave groove P5a may be arranged at substantially equal intervals in a peripheral direction of the punch P5.

A lower end portion of the punch P6 has a shape corresponding to the die hole D63. The lower end portion may be, for example, a columnar body having a circular cross section.

As illustrated in FIG. 3, the switching device 153 may be arranged above the punch P3 and inside the punch holder 151. When the press processing device 130 includes a plurality of punches P3, the same number of switching devices 153 as the plurality of punches P3 may be arranged above the punches P3 so as to correspond to the respective punches P3.

The switching device 153 is, for example, a cam mechanism, and includes a cam member 153a and an actuator 153b. The cam member 153a is configured to be slidable in a horizontal direction. On a lower surface side of the cam member 153a, a concave portion 153c recessed upward is provided. The concave portion 153c is configured such that the head portion of the punch P3 can be housed therein.

The actuator 153b is configured to drive the cam member 153a in the horizontal direction based on an instruction signal from the controller Ctr. The actuator 153b may be configured to move the cam member 153a between a first position where the head portion of the punch P3 is located outside the concave portion 153c and is in contact with a lower surface of the cam member 153a and a second position where the head portion of the punch P3 is housed in the concave portion 153c, for example. The actuator 153b may be arranged outside the upper die 150 instead of inside the punch holder 151.

The pressing machine 160 is located above the upper die 150. A piston of the pressing machine 160 is connected to the punch holder 151 and operates based on an instruction signal from the controller Ctr. When the pressing machine 160 operates, the piston thereof expands and contracts, and the upper die 150 moves up and down as a whole.

When the cam member 153*a* is in the first position (see FIG. 3), a tip end portion of the punch P3 is located relatively downward. In a case where the punch P3 is in such a protruding state, when the pressing machine 160 operates and the upper die 150 moves downward, the tip end portion of the punch P3 is inserted into the die hole D33, so that the metal sheet MS is punched.

On the other hand, when the cam member 153*a* is in the second position, the punch P3 moves relatively upward due to a biasing force of the biasing member 154, and the head portion of the punch P3 is housed in the concave portion 153*c*. In a case where the punch P3 is in such a retracted state, when the pressing machine 160 operates and the upper die 150 moves downward, the tip end portion of the punch P3 is not inserted into the die hole D33 and does not contact the metal sheet MS, so that the metal sheet MS is not processed at all. In this way, the switching device 153 is configured to be able to selectively change the state of the punch P3.

[Method for Manufacturing Laminated Body]

Next, a method for manufacturing the laminated body 10 will be described with reference to FIGS. 4 to 7. Hereinafter, a description will be given based on an example of the manufacturing device 100 including six punches P3, six punches P4, six punches P5 provided with the concave groove P5*a*, and six switching devices 153, in which states of the six punches P3 can be individually controlled by the corresponding switching devices 153 (see FIG. 4).

When the metal sheet MS is intermittently fed to the press processing device 130 by the feeding device 120 and a predetermined part of the metal sheet MS reaches the die member D1, the pressing machine 160 operates to push the upper die 150 downward toward the lower die 140. Even after the stripper 152 reaches the metal sheet MS and the metal sheet MS is sandwiched between the stripper 152 and the die member D1, the pressing machine 160 pushes the upper die 150 downward.

At this time, the stripper 152 does not move, but the punch holder 151 and the punches P1 to P6 continue to move downward. Therefore, the tip end portions of the punches P1 to P6 move in the respective through holes of the stripper 152 and further reach the die holes D13 to D63. In this process, the punch P1 punches the metal sheet MS along the die hole D13. As a result, the through hole We corresponding to the magnet-insert hole 16 is formed in the metal sheet MS. The waste material punched out is discharged from the discharge hole C1. Then, the pressing machine 160 operates to raise the upper die 150.

Next, when the metal sheet MS is intermittently sent by the feeding device 120 and the predetermined part of the metal sheet MS reaches the die member D2, the upper die 150 is moved up and down by the pressing machine 160, and the half punching or punching of the metal sheet MS by the punch P2 is performed similarly to the above. As a result, the unevenness or through holes corresponding to the caulk portion 18 is formed in the metal sheet MS. The waste material punched out is discharged from the discharge hole C2.

Figure 5:
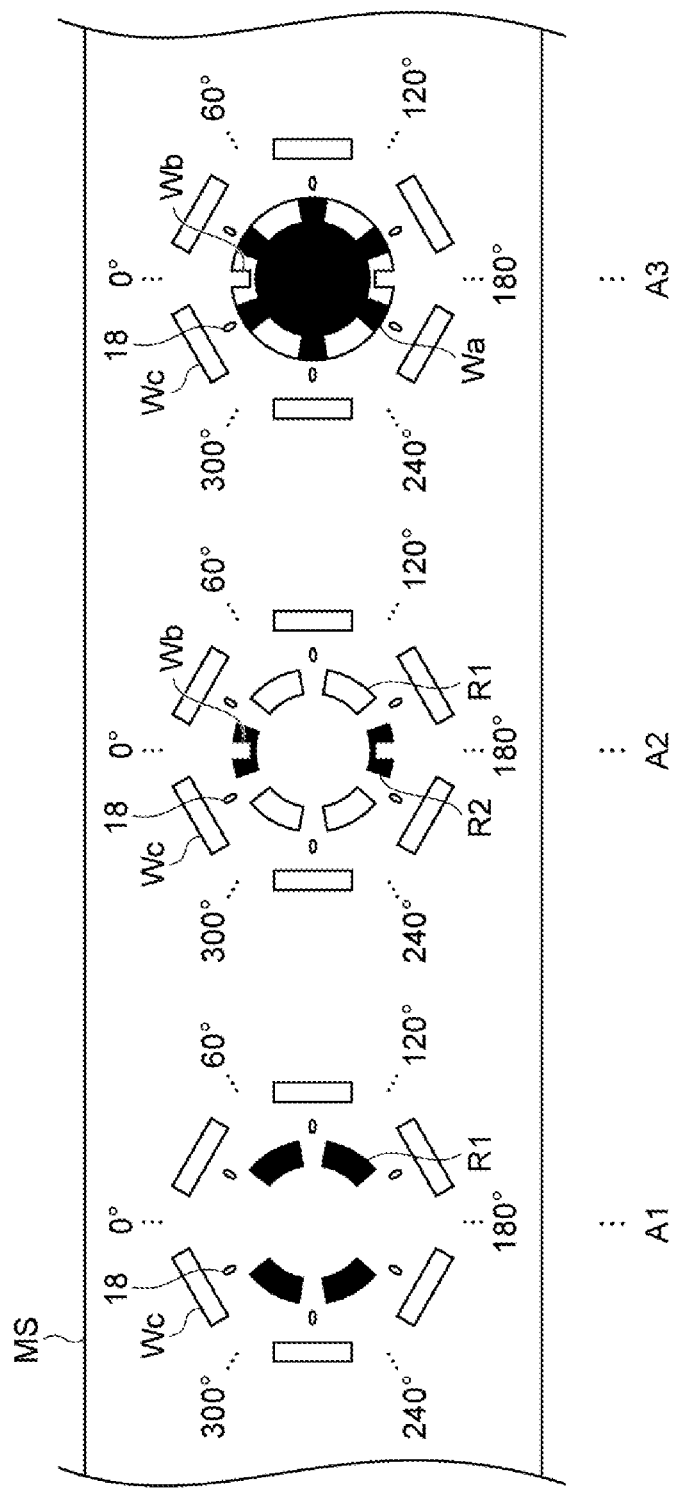
FIG. 5 is a diagram showing an example of a layout for punching a rotor laminated iron core.

Next, when the metal sheet MS is intermittently sent by the feeding device 120 and the predetermined part of the metal sheet MS (refer to a processing area A1 in FIG. 5) reaches the die member D3, the upper die 150 is moved up and down by the pressing machine 160, and the punching (nullification processing) of the metal sheet MS by the punch P3 is performed similarly to the above. When the controller Ctr controls each switching device 153 such that the two punches P3 located in the phases of 0° and 180° are in the retracted state and the remaining four punches P3 are in the protruding state, four through holes R1 are formed in the metal sheet MS at positions corresponding to the four punches P3 (refer to the black-painted areas in the processing area A1 in FIG. 5). The through hole R1 has a shape corresponding to the punch P3 and the die hole D33. In the example of FIG. 5, the through hole R1 may have an annular sector shape. The waste material punched out is discharged from the discharge hole C3.

Next, when the metal sheet MS is intermittently sent by the feeding device 120 and the predetermined part of the metal sheet MS (refer to a processing area A2 in FIG. 5) reaches the die member D4, the upper die 150 is moved up and down by the pressing machine 160, and the punching (protrusion forming processing) of the metal sheet MS by the punch P4 is performed similarly to the above. Since the four through holes R1 are formed in the previous process, the four punches P4 located in the phases of 60°, 120°, 240° and 300° pass through the corresponding through holes R1 without coming into contact with the metal sheet MS. On the other hand, the two punches P4 located at the phases of 0° and 180° punch the metal sheet MS. As a result, two through holes R2 are formed in the metal sheet MS at positions corresponding to the two punches P4 (refer to the black-painted areas in the processing area A2 in FIG. 5). The through hole R2 has a shape corresponding to the punch P4 and the die hole D43. In the example of FIG. 5, the through hole R2 has an annular sector shape as a whole, and the protrusion Wb protruding from the outer peripheral edge toward the inner peripheral edge may be provided on the outer peripheral edge. The waste material punched out is discharged from the discharge hole C4.

Next, when the metal sheet MS is intermittently sent by the feeding device 120 and the predetermined part of the metal sheet MS (refer to a processing area A3 in FIG. 5) reaches the die member D5, the upper die 150 is moved up and down by the pressing machine 160, and the punching of the metal sheet MS by the punch P5 is performed similarly to the above. At this time, since an outer peripheral surface of the punch P5 is provided with the concave grooves P5*a* in the phases of 0°, 60°, 120°, 180°, 240°, and 300°, respectively, the concave grooves P5*a* located in the phase of 0° and 180° pass through the corresponding protrusions Wb. That is, the punch P5 punches the metal sheet MS without punching the protrusions Wb (inner-shape blanking processing). Since the through holes R1 and R2 are formed in the metal sheet MS in the previous process, the black-painted area in the processing area A3 of FIG. 5 is punched out from the metal sheet MS by the punch P5. As a result, the center hole Wa is formed in the metal sheet MS. The waste material punched out is discharged from the discharge hole C5.

Next, when the metal sheet MS is intermittently sent by the feeding device 120 and the predetermined part of the metal sheet MS reaches the die member D6, the upper die 150 is moved up and down by the pressing machine 160, and the punching of the metal sheet MS by the punch P6 (outer-shape blanking processing) is performed similarly to the above. As a result, the punched member W in which the protrusions Wb are located at the phases of 0° and 180° is formed. The punched member W after being punched is laminated on a punched member W punched previously in the die hole D63.

Figure 6:
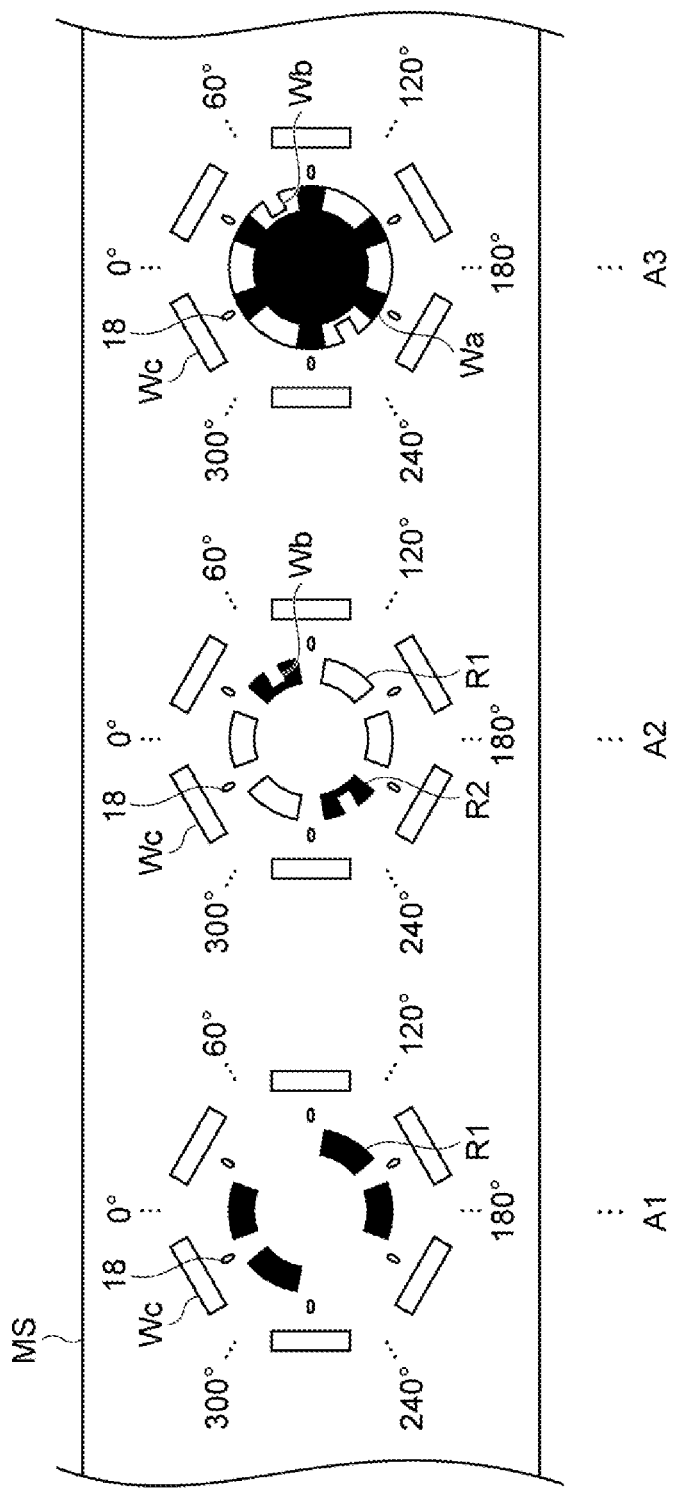
FIG. 6 is a diagram showing an example of a layout for punching the rotor laminated iron core.

In the processing area A1, when the controller Ctr controls each switching device 153 such that the two punches P3 located in the phases of 60° and 240° are in the retracted state and the remaining four punches P3 are in the protruding state, four through holes R1 are formed in the metal sheet MS at positions corresponding to the four punches P3 (refer to the black-painted areas in the processing area A1 in FIG. 6). In this case, in the subsequent process, the four punches P4 located in the phases of 0°, 120°, 180°, and 300° pass through the corresponding through holes R1 without coming into contact with the metal sheet MS. On the other hand, the two punches P4 located at the phases of 60° and 240° punch the metal sheet MS. As a result, two through holes R2 are formed in the metal sheet MS at positions corresponding to the two punches P4 (refer to the black-painted areas in the processing area A2 in FIG. 6).

Further, in the subsequent process, when the punch P5 moves up and down, the concave grooves P5a located at the phases of 60° and 240° pass through the corresponding protrusions Wb. That is, the punch P5 punches the metal sheet MS without punching the protrusions Wb (inner-shape blanking processing). Since the through holes R1 and R2 are formed in the metal sheet MS in the previous process, the black-painted area in the processing area A3 of FIG. 6 is punched out from the metal sheet MS by the punch P5. As a result, the center hole Wa is formed in the metal sheet MS. Further, in the subsequent process, the punching of the metal sheet MS (outer-shape blanking processing) is performed by the punch P6, so as to form the punched member W in which the protrusions Wb are located at the phases of 60° and 240°.

Figure 7:
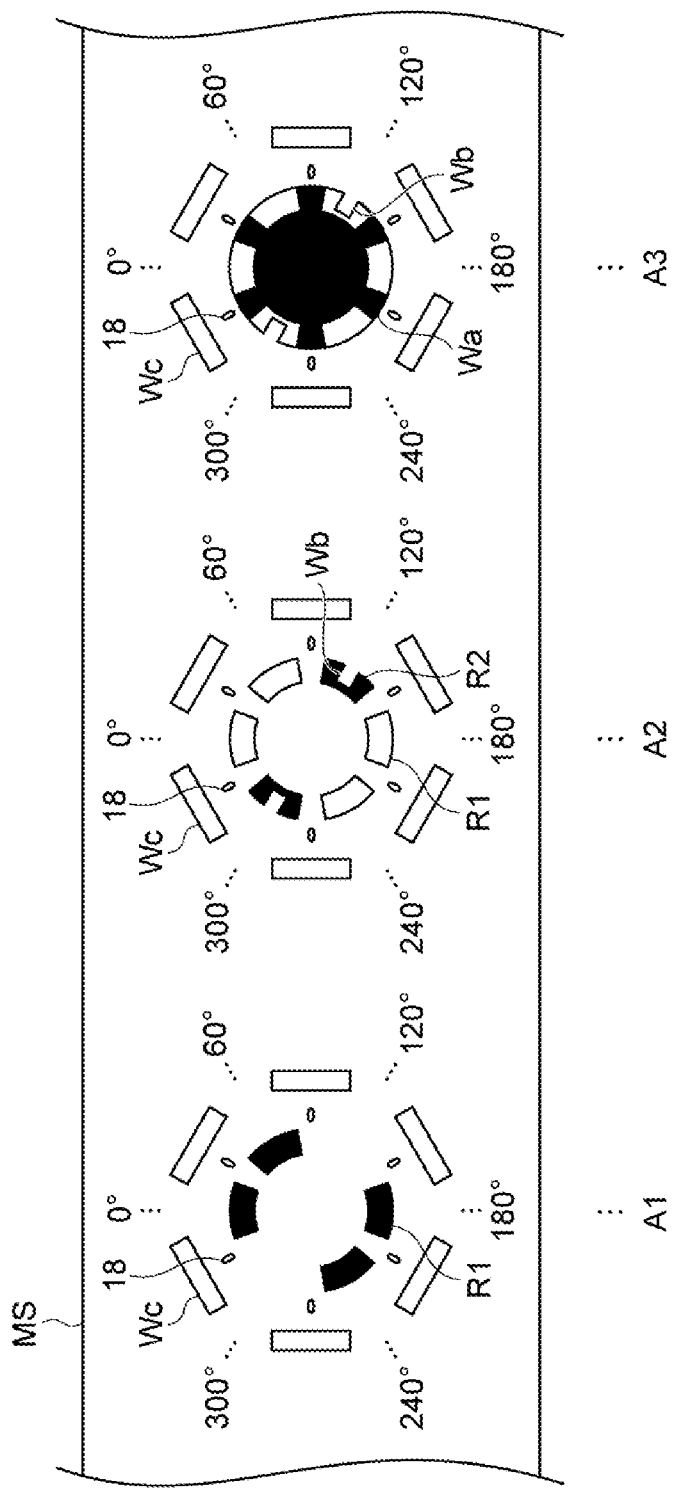
FIG. 7 is a diagram showing an example of a layout for punching the rotor laminated iron core.

In the processing area A1, when the controller Ctr controls each switching device 153 such that the two punches P3 located in the phases of 120° and 300° are in the retracted state and the remaining four punches P3 are in the protruding state, four through holes R1 are formed in the metal sheet MS at positions corresponding to the four punches P3 (refer to the black-painted areas in the processing area A1 in FIG. 7). In this case, in the subsequent process, the four punches P4 located in the phases of 0°, 60°, 180°, and 240° pass through the corresponding through holes R1 without coming into contact with the metal sheet MS. On the other hand, the two punches P4 located at the phases of 120° and 300° punch the metal sheet MS. As a result, two through holes R2 are formed in the metal sheet MS at positions corresponding to the two punches P4 (refer to the black-painted areas in the processing area A2 in FIG. 7).

Further, in the subsequent process, when the punch P5 moves up and down, the concave grooves P5a located at the phases of 120° and 300° pass through the corresponding protrusions Wb. That is, the punch P5 punches the metal sheet MS without punching the protrusions Wb (inner-shape blanking processing). Since the through holes R1 and R2 are formed in the metal sheet MS in the previous process, the black-painted area in the processing area A3 of FIG. 7 is punched out from the metal sheet MS by the punch P5. As a result, the center hole Wa is formed in the metal sheet MS. Further, in the subsequent process, the punching of the metal sheet MS (outer-shape blanking processing) is performed by the punch P6, so as to form the punched member W in which the protrusions Wb are located at the phases of 120° and 300°.

The punched members W punched out as described above are laminated while being rotated in the die hole D63 such that the protrusions Wb overlap with each other in the height direction. Thereafter, when a predetermined number of punched members W are laminated, the laminated body 10 is completed.

[Effects]

According to the above embodiment, the metal sheet MS is processed by the unit including the plurality of punches P4 as a set to form the protrusions Wb. That is, a processing position by the plurality of punches P4 is limited to one position (processing area A2) in the longitudinal direction of the metal sheet MS. Therefore, the positional accuracy of the protrusions Wb formed by the plurality of punches P4 is improved, and thus when the plurality of punched members W are laminated, the displacement of the protrusions Wb in the height direction of the laminated body 10 is less likely to occur. Further, according to the above example, the unit of the punches P4 for forming the protrusions Wb and the punches P5 for the inner-shape blanking are separate bodies. Therefore, even if one of the punches P4 of the unit is damaged, it is not necessary to replace the punch P5 for the inner-shape blanking, and the maintainability of the manufacturing device 100 is improved. As a result, the laminated body 10 can be manufactured with high accuracy and low cost.

According to the above embodiment, the position of the punch P3 in the retracted state can be switched to a different position at a predetermined timing. In this case, by laminating these punched members W while being rotated, it is possible to offset the plate thickness deviation of the punched members W and increase the flatness, parallelism, and perpendicularity of the laminated body 10. The predetermined timing may be a regular timing (for example, every time the nullification processing described above is performed) or an irregular timing.

According to the above embodiment, the unit including the plurality of punches P4 as a set can be arranged at the downstream side from the punch P3. In this case, first, the nullification processing by the punch P3 is performed on the metal sheet MS, and then the protrusions Wb are formed by the punches P4 on the metal sheet MS. Therefore, the punches P4 do not contact the metal sheet MS at the location where the nullification processing is already performed (through holes R1). Therefore, as compared with the case where a plurality of protrusions Wb are formed by the plurality of punches P4 and then a predetermined number of protrusions Wb are subjected to the nullification processing (punching) by the punch P3, scraps are less likely to occur and burrs are less likely to be formed on the metal sheet MS. As a result, the laminated body 10 can be formed with higher quality.

According to the above embodiment, the plurality of punches P3 may be a set of units and configured to be individually operable by the corresponding switching device 153. In this case, the processing position by the plurality of punches P3 is limited to one position (processing area A1) in the longitudinal direction of the metal sheet MS. That is, it is not necessary to arrange the plurality of punches P3 side by side along the longitudinal direction of the metal sheet MS. Therefore, the number of processes for the nullification processing is reduced. Therefore, a production time of the laminated body 10 can be shortened, and the productivity can be improved.

According to the above embodiment, the press processing device 130 may include a plurality of dies D42 respectively corresponding to the plurality of punches P4. In this case, the dies D42 are also individualized, so that even if a predetermined die D42 is damaged when forming the protrusion Wb, only the damaged die D42 needs to be replaced. Therefore, the maintainability of the manufacturing device 100 is further improved, and the laminated body 10 can be manufactured at a lower cost.

[Modifications]

It should be understood that the disclosure in the present description is merely illustrated in all respect and not restrictive. Various omissions, substitutions, and changes may be made to the above examples without departing from the scope of the claims and the gist thereof.

(1) The manufacturing device 100 may include a plurality of die members D3. The plurality of die members D3 may be arranged in a line along the transport direction of the metal sheet MS. The die D32 of each die member D3 may be provided with at least one die hole D33. For example, the plurality of punches P3 for nullification processing may not be grouped as a unit. In other words, the plurality of punches P3 for nullification processing may include one punch P3 arranged in the relatively upstream side in the transport direction of the metal sheet MS, and the other punch P3 arranged at the downstream side of the one punch P3. In this case, the other punch P3 is configured to perform the nullification processing on the metal sheet MS at a timing (at a different processing position) different from that of the one punch P3.

Figure 8:
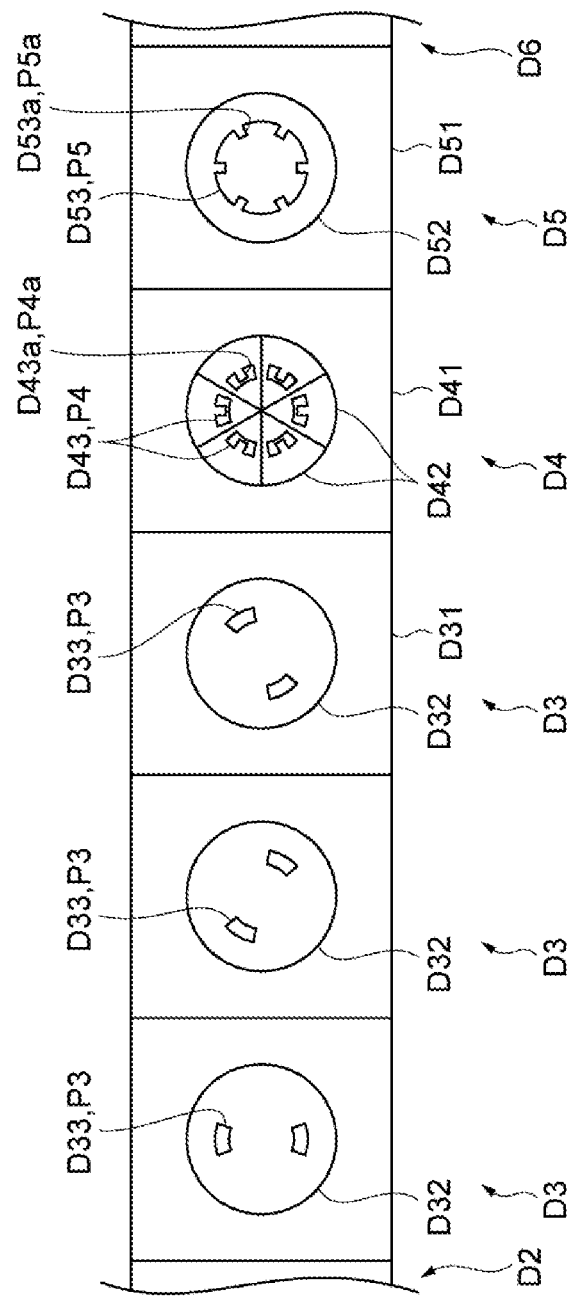
FIG. 8 is a top view schematically showing another example of a punch included in the press processing device.

In the example shown in FIG. 8, the manufacturing device 100 includes three die members D3. The die D32 of the die member D3 located upstream includes die holes D33 located at phases of 0° and 180°, respectively. The die D32 of the die member D3 located in the middle includes die holes D33 located at phases of 60° and 240°, respectively. The die D32 of the die member D3 located at downstream includes die holes D33 located at phases of 120° and 300°, respectively. In this case, among an upstream side processing unit configured by an upstream die member D3 and a punch P3 corresponding thereto, a middle processing unit configured by a middle die member D3 and a punch P3 corresponding thereto, and a downstream side processing unit configured by a downstream die member D3 and a punch P3 corresponding thereto, any two of the processing units perform the nullification processing on the metal sheet MS, while the remaining one processing unit does not perform the nullification processing, and the metal sheet MS is transported to the die member D4. At this time, the punches P3 corresponding to the two processing units are in the protruding state, and the punch P3 corresponding to the remaining processing unit is in the retracted state.

(2) A unit including a plurality of punches P4 as a set may be arranged on the upstream side of the punches P3. Alternatively, the punches P3 and P4 may be arranged such that a part of the plurality of punches P3, the unit including the plurality of punches P4 as a set, and the rest of the plurality of punches P3 are arrange in order from the upstream side.

Figure 9:
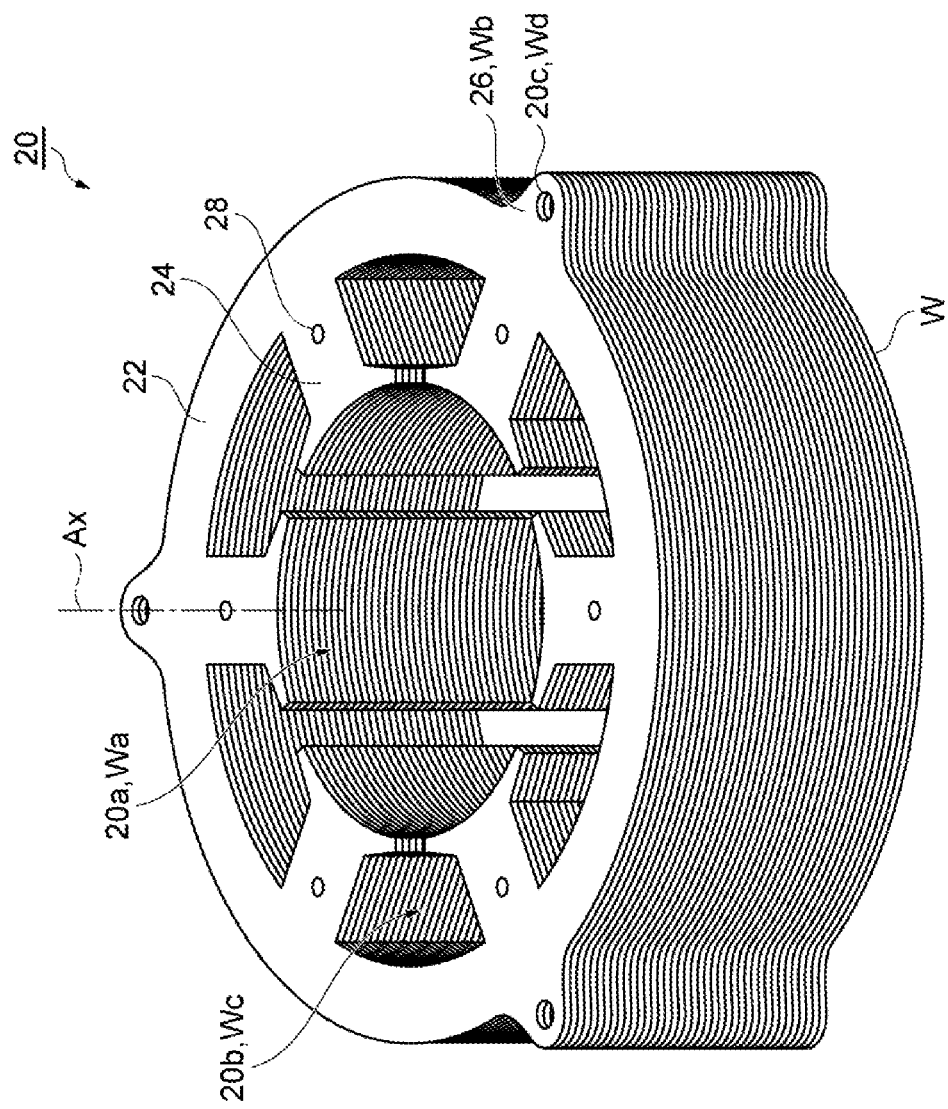
FIG. 9 is a perspective view showing an example of a stator laminated iron core.

(3) When manufacturing a laminated iron core other than the rotor laminated iron core 2, the manufacturing device 100 described above may be used. As shown in FIG. 9, the other laminated iron core may be a stator laminated iron core 20 in which a plurality of annular punched members W are laminated. The stator laminated iron core 20 has a cylindrical shape. That is, a through hole 20a which extends along a center axis Ax is provided in a central portion of the stator laminated iron core 20. The rotor 1 may be arranged in the through hole 20a.

The stator laminated iron core 20 includes one yoke portion 22, a plurality of tooth portions 24, and at least one lug portion 26. The yoke portion 22 has an annular shape and extends so as to surround the center axis Ax. Each of the plurality of tooth portions 24 extends from an inner peripheral edge of the yoke portion 22 toward the center axis Ax side along a radial direction of the yoke portion 22. The plurality of tooth portions 24 may be arranged at substantially equal intervals in a peripheral direction of the yoke portion 22.

A winding wire (not shown) may be wound around each tooth portion 24. A slot 20b, which is a space for arranging the winding wire, is defined between the adjacent tooth portions 24. Each tooth portion 24 is provided with a caulk portion 28. Like the caulk portion 18, the caulk portion 28 is configured to bond the punched members W adjacent to each other in the laminating direction.

The lug portion 26 protrudes radially outward from an outer peripheral edge of the yoke portion 22 so as to be separated from the center axis Ax. The lug portion 26 extends linearly in the height direction from one end surface to the other end surface of the stator laminated iron core 20. When the stator laminated iron core 20 includes a plurality of lug portions 26, the plurality of lug portions 26 may be arranged at substantially equal intervals in the peripheral direction of the yoke portion 22.

Each lug portion 26 is provided with a through hole 20c extending in the height direction. Bolts for fixing the stator laminated iron core 20 to other members (for example, a housing of an electric motor) can be inserted into the through holes 20c.

The punched members W have a shape corresponding to the stator laminated iron core 20. That is, the punched members W have an annular shape as a whole, and include a center hole Wa corresponding to the through hole 20a, a protrusion Wb corresponding to the lug portion 26, a through hole Wc corresponding to the slot 20b, and a through hole Wd corresponding to the through hole 20c. That is, at least one protrusion Wb is provided on an outer peripheral edge of the punched members W.

Figure 10:
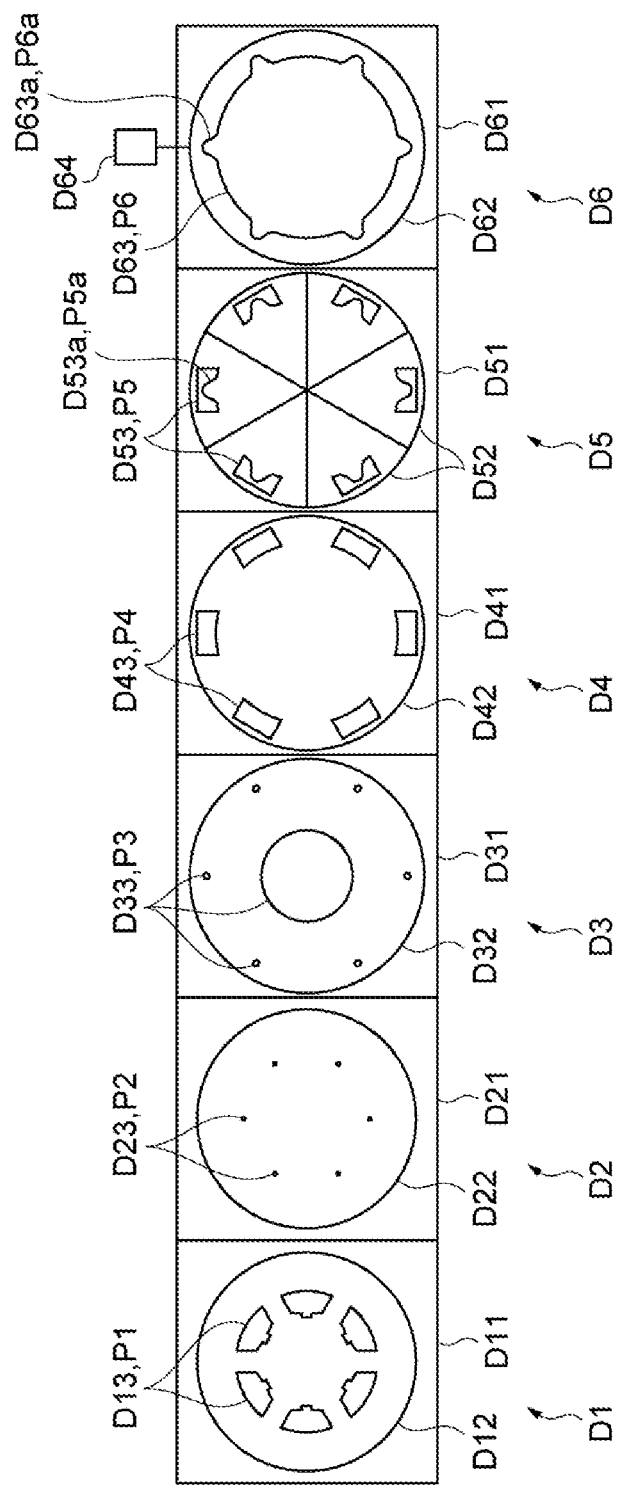
FIG. 10 is a top view schematically showing still another example of a punch included in the press processing device.

When manufacturing such a stator laminated iron core 20, the manufacturing device 100 may include die members D1 to D6 illustrated in FIG. 10 and punches P1 to P6 corresponding to the die members D1 to D6, respectively. A die D12 of the die member D1 may be provided with a plurality of die holes D13 having a shape corresponding to the slot 20b. A die D22 of the die member D2 may be provided with a plurality of die holes D23 having a shape corresponding to the caulk portion 28. A die D32 of the die member D3 may be provided with a plurality of die holes D33 having a shape corresponding to the through holes 20a and 20c. The lower end portions of the punches P1 to P3 may have shapes corresponding to the die holes D13, D23, D33, respectively.

A die D42 of the die member D4 may be provided with a die hole D43 for nullification processing. The die hole D43 may be located outside a region where the punched member W is to be formed in the metal sheet MS. The die hole D43 may have, for example, an annular sector shape. A lower end portion of the punch P4 may have a shape corresponding to the die hole D43.

A die D52 of the die member D5 may be provided with a die hole D53 for forming the protrusion Wb. The die hole D53 may be located outside a region where the punched member W is to be formed in the metal sheet MS. The die hole D43 may have, for example, an annular sector shape as a whole. The die hole D53 may be provided with a protruding ridge D53a protruding from an inner side to an outer side on the inner peripheral edge. A lower end portion of the punch P5 may have a shape corresponding to the die hole D53. An inner peripheral surface of the lower end portion may be provided with, for example, a concave groove P5a extending in the upper-lower direction.

A die D62 of the die member D6 may be provided with a die hole D63 for outer-shape blanking processing. The die hole D63 may have, for example, a circular shape as a whole. The die hole D53 may be provided with a concave groove D63a which is recessed outward from the peripheral edge on the peripheral edge. The number of the concave grooves D63a may be the same as that of the die holes D43, D53. A lower end portion of the punch P6 may have a shape corresponding to the die hole D63. An outer peripheral surface of the lower end portion may be provided with, for example, a protruding ridge P6a extending in the upper-lower direction.

Figure 11:
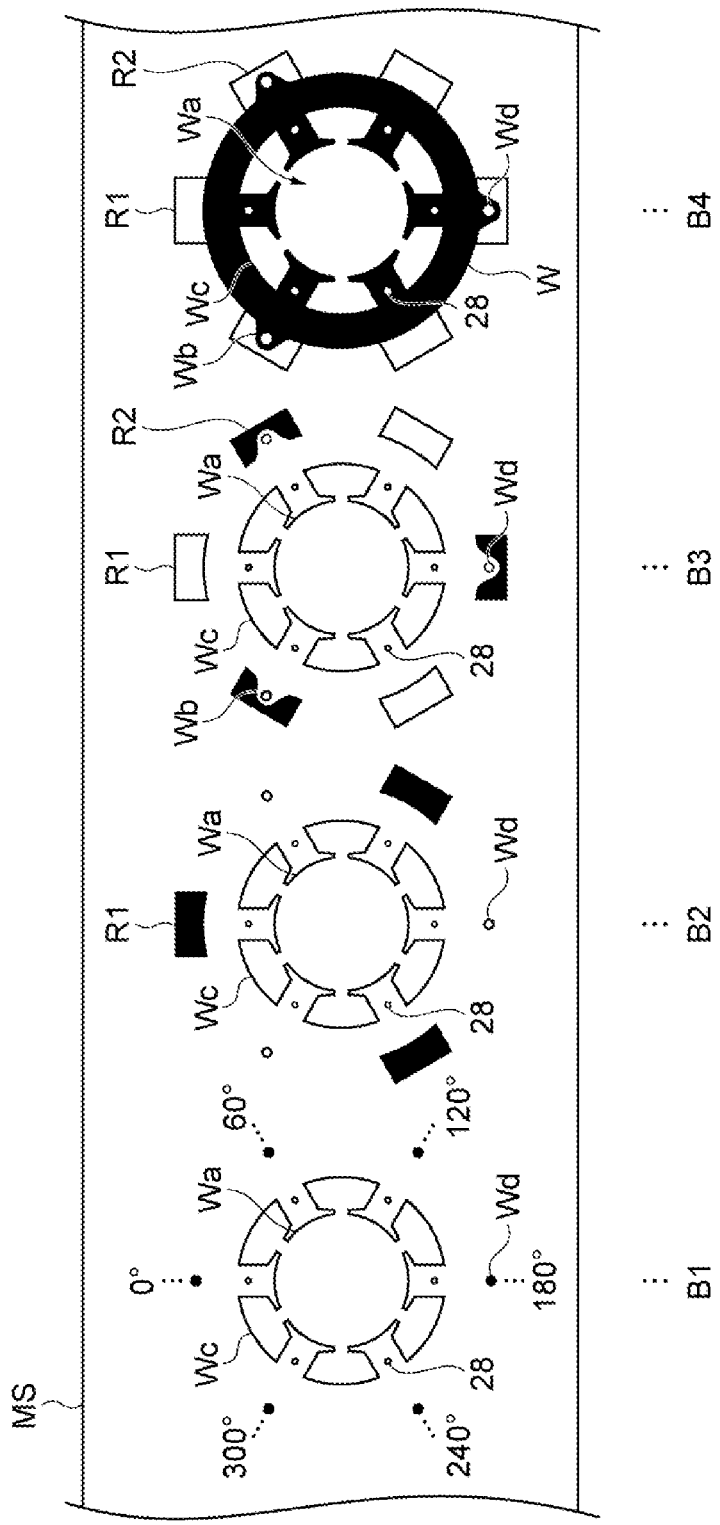
FIG. 11 is a diagram showing an example of a layout for punching a stator laminated iron core.

Next, a method for manufacturing the stator laminated iron core 20 will be described with reference to FIGS. 10 to 12. Hereinafter, a description will be given based on an example of the manufacturing device 100 including six punches P4, six punches P5, six punches P6 provided with the protruding ridges P6a, and six switching devices 153, in which states of the six punches P4 can be individually controlled by the corresponding switching devices 153 (see FIG. 10).

When the metal sheet MS is intermittently fed to the press processing device 130 by the feeding device 120 and a predetermined part of the metal sheet MS reaches the die member D1, the upper die 150 is moved up and down by the pressing machine 160, and the punching of the metal sheet MS by the punch P1 is performed. As a result, the through hole We corresponding to the slot 20b is formed in the metal sheet MS. The waste material punched out is discharged from the discharge hole C1.

Next, when the metal sheet MS is intermittently sent by the feeding device 120 and the predetermined part of the metal sheet MS reaches the die member D2, the upper die 150 is moved up and down by the pressing machine 160, and the half punching or punching of the metal sheet MS by the punch P2 is performed similarly to the above. As a result, the unevenness or through holes corresponding to the caulk portion 28 is formed in the metal sheet MS. The waste material punched out is discharged from the discharge hole C2.

Next, when the metal sheet MS is intermittently sent by the feeding device 120 and the predetermined part of the metal sheet MS (refer to a processing area B1 in FIG. 11) reaches the die member D3, the upper die 150 is moved up and down by the pressing machine 160, and the punching of the metal sheet MS by the punch P3 is performed similarly to the above. As a result, the through hole Wd corresponding to the through hole 20c is formed in the metal sheet MS (refer to the black-painted areas in the processing area B1 in FIG. 11). The waste material punched out is discharged from the discharge hole C3.

Next, when the metal sheet MS is intermittently sent by the feeding device 120 and the predetermined part of the metal sheet MS (refer to a processing area B2 in FIG. 11) reaches the die member D4, the upper die 150 is moved up and down by the pressing machine 160, and the punching (nullification processing) of the metal sheet MS by the punch P4 is performed similarly to the above. When the controller Ctr controls each switching device 153 such that the three punches P4 located in the phases of 60°, 180°, and 300° are in the retracted state and the remaining three punches P4 are in the protruding state, three through holes R1 are formed in the metal sheet MS at positions corresponding to the latter three punches P4 (refer to the black-painted areas in the processing area B2 in FIG. 11). At this time, the through hole Wd formed at the position overlapping the through hole R1 is removed from the metal sheet MS. The waste material punched out is discharged from the discharge hole C4.

Next, when the metal sheet MS is intermittently sent by the feeding device 120 and the predetermined part of the metal sheet MS (refer to a processing area B5 in FIG. 11) reaches the die member D5, the upper die 150 is moved up and down by the pressing machine 160, and the punching (protrusion forming processing) of the metal sheet MS by the punch P5 is performed similarly to the above. At this time, since the three through holes R1 are formed in the previous process, the three punches P5 located in the phases of 0°, 120°, and 240° pass through the corresponding through holes R1 without coming into contact with the metal sheet MS. On the other hand, the three punches P5 located at the phases of 60°, 180°, and 300° punch the metal sheet MS. As a result, three through holes R2 are formed in the metal sheet MS at positions corresponding to the latter three punches P5 (refer to the black-painted areas in the processing area B3 in FIG. 11). The waste material punched out is discharged from the discharge hole C5.

Next, when the metal sheet MS is intermittently sent by the feeding device 120 and the predetermined part of the metal sheet MS (refer to a processing area B4 in FIG. 11) reaches the die member D6, the upper die 150 is moved up and down by the pressing machine 160, and the punching (outer-shape blanking processing) of the metal sheet MS by the punch P6 is performed similarly to the above. At this time, since an outer peripheral surface of the punch P6 is provided with the protruding ridges P6a in the phases of 0°, 60°, 120°, 180°, 240°, and 300°, respectively, the protruding ridges P6a located in the phase of 0°, 120°, and 240° pass through the corresponding through holes R1. On the other hand, the protruding ridges P6a located at the phases of 60°, 180°, and 300° punch the metal sheet MS so as to form the protrusions Wb. As a result, the punched member W in which the protrusions Wb are located at the phases of 60°, 180°, and 300° is formed.

Figure 12:
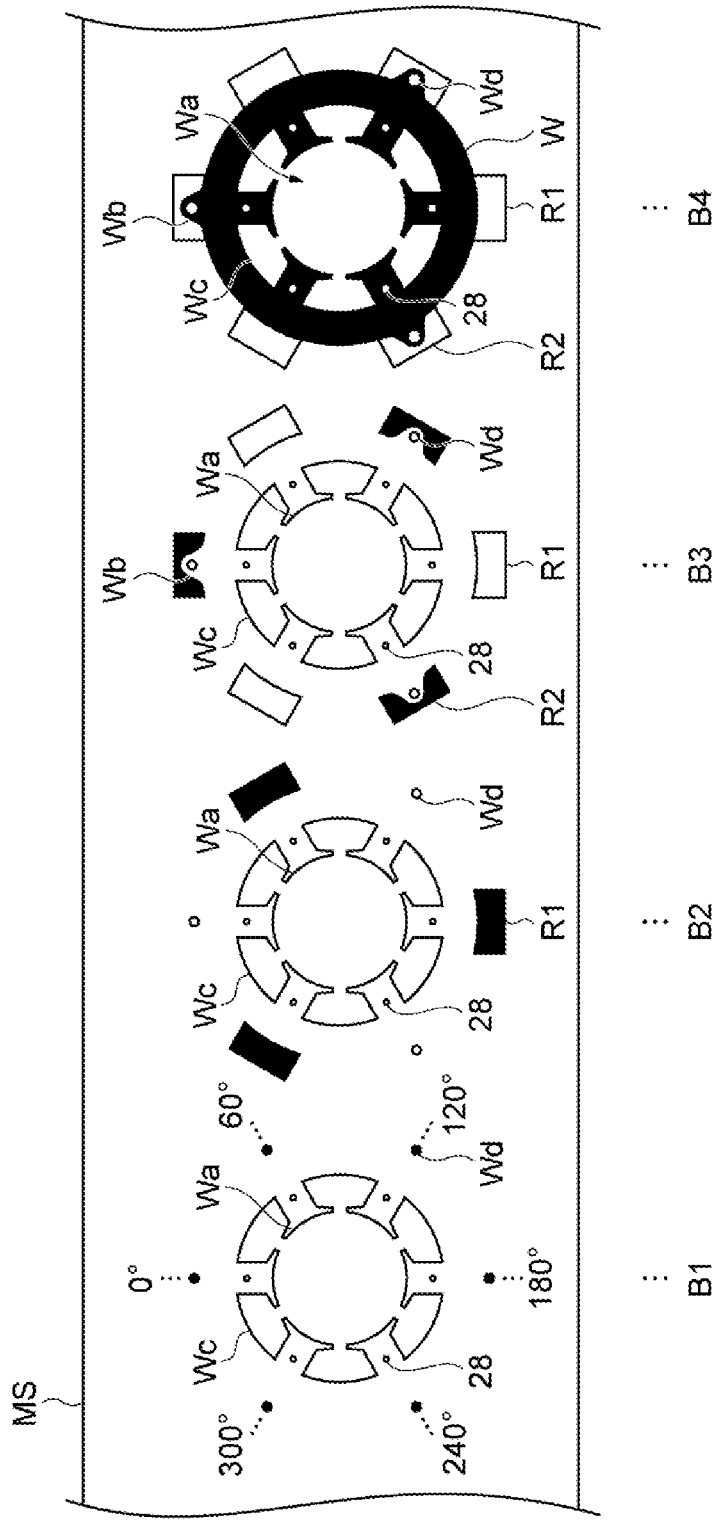
FIG. 12 is a diagram showing an example of a layout for punching the stator laminated iron core.

In the processing area B1, when the controller Ctr controls each switching device 153 such that the three punches P4 located in the phases of 0°, 120°, and 240° are in the retracted state and the remaining three punches P4 are in the protruding state, three through holes R1 are formed in the metal sheet MS at positions corresponding to the latter three punches P4 (refer to the black-painted areas in the processing area B2 in FIG. 12). In this case, in the subsequent process, the three punches P5 located in the phases of 60°, 180°, and 300° pass through the corresponding through holes R1 without coming into contact with the metal sheet MS. On the other hand, the three punches P5 located at the phases of 0°, 120°, and 240° punch the metal sheet MS. As a result, three through holes R2 are formed in the metal sheet MS at positions corresponding to the latter three punches P5 (refer to the black-painted areas in the processing area B3 in FIG. 12).

Further, in the subsequent process, when the punch P6 moves up and down, the protruding ridges P6a located at the phases of 60°, 180°, and 300° pass through the corresponding through holes R1. On the other hand, the three punches P6 located at the phases of 0°, 120°, and 240° punch the metal sheet MS. As a result, the punched member W in which the protrusions Wb are located at the phases of 0°, 120°, and 240° is formed.

The punched members W punched out as described above are laminated while being rotated in the die hole D63 such that the protrusions Wb overlap with each other in the height direction. Thereafter, when a predetermined number of punched members W are laminated, the stator laminated iron core 20 is completed.

(4) When manufacturing an intermediate laminated body including a temporary caulking portion, the manufacturing device 100 described above may be used. Thereafter, the temporary caulking portion is removed from the intermediate laminated body, so that a laminated body to be the rotor laminated iron core may be formed, or a laminated body to be the stator laminated iron core may be formed. The temporary caulking portion may be provided on an inner peripheral surface of the intermediate laminated body, or may be provided on an outer peripheral surface of the intermediate laminated body. The term "temporary caulking portion" refers to a caulking portion which is used to temporarily integrate a plurality of punched members W and is removed in the process of manufacturing a laminated body.

Figure 13:
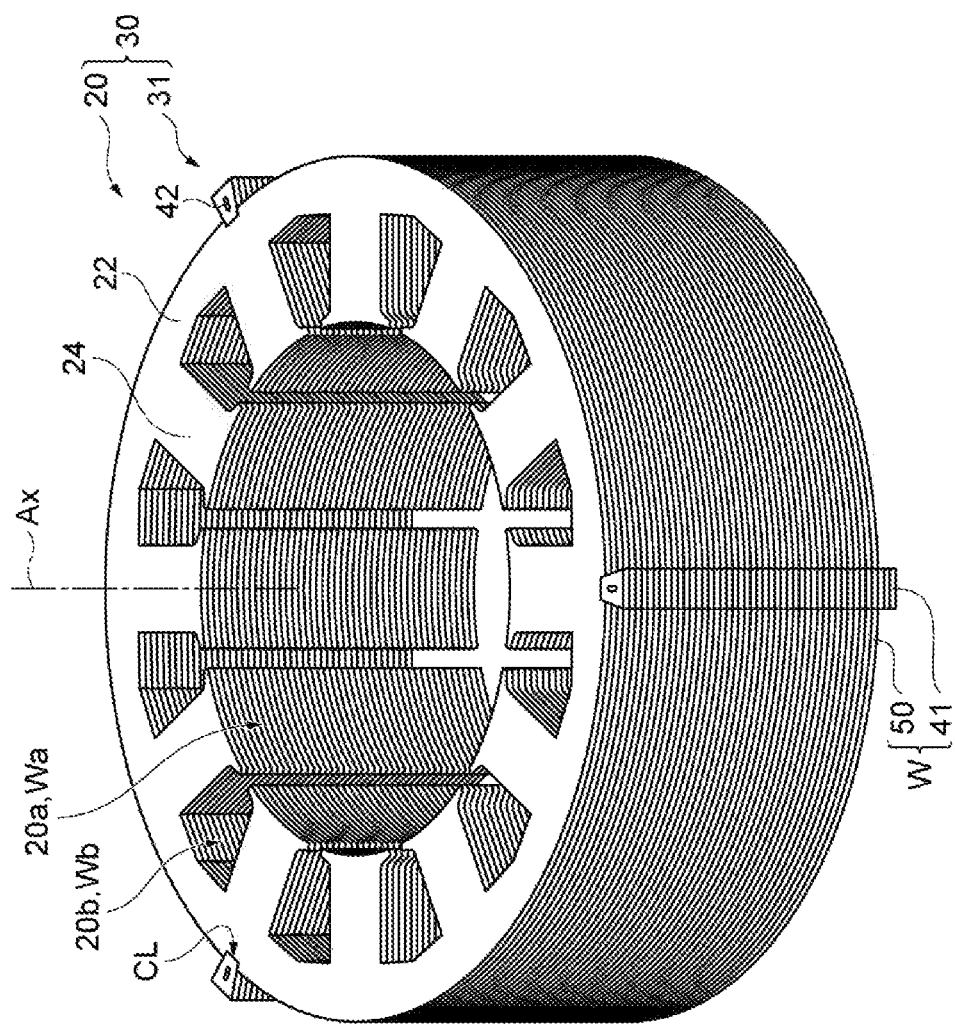
FIG. 13 is a perspective view showing an example of an intermediate body that configures the stator laminated iron core.

An example of the intermediate laminated body 30 will be described with reference to FIG. 13. The intermediate laminated body 30 includes a stator laminated iron core 20 and a temporary caulking portion 31 provided on an outer peripheral surface of the stator laminated iron core 20. The intermediate laminated body 30 is configured by laminating a plurality of punched members W. The punched member W is in a state in which a temporary caulking piece 41 corresponding to the temporary caulking portion 31 is fitted to an outer peripheral edge of a process plate 50 corresponding to the stator laminated iron core 20. The punched members W adjacent to each other in the height direction of the intermediate laminated body 30 are interlocked to each other via a caulk portion 42 provided on the temporary caulking piece 41.

Cutting lines CL are provided between the temporary caulking piece 41 and the process plate 50. Each cutting line CL may be formed, for example, by performing a cutting and bending processing or a punching processing on the metal sheet MS, and then pushing back the processed portion and press-fitting into the original metal sheet MS. When the metal sheet MS is subjected to the cutting and bending processing or the punching processing, the processed portion is plastically deformed and slightly extends. Therefore, when the processed portion is press-fitted into the original metal sheet MS, the processed portion and the original metal sheet MS are firmly fitted to each other to an extent of not being able to be easily separated by hand.

(5) The manufacturing device 100 may be used when forming a punched member W in which M (M being a natural number of 1 or more) protrusions Wb are provided on an inner peripheral edge or an outer peripheral edge. In this case, the manufacturing device 100 may include a punch unit including N (N being a natural number larger than M) punches P4 as a set and N punches P3. The punch unit may include, for example, six punches P4 or eight punches P4. In this case, the manufacturing device 100 may include the same number of punches P3 and punches P4. Therefore, even if the number of punches P4 included in the punch unit increases, the number of punches P3 does not exceed the number of punches P4. Therefore, the configuration of the device is simplified, so that the manufacturing cost of the manufacturing device 100 can be reduced.

OTHER EXAMPLES

Example 1

An example of a device (100) for manufacturing a laminated iron core may be configured to punch out a plurality of punched members (W) having an annular shape and having M (M being a natural number of 1 or more) protrusions (Wb) provided on an inner peripheral edge or an outer peripheral edge thereof from a metal sheet (MS), and laminate the plurality of punched members while being rotated. The example of the device (100) for manufacturing a laminated iron core may include a punch unit for forming protrusion including N (N being a natural number larger than M) punches (P4) as a set, and N auxiliary punches (P3). The N auxiliary punches (P3) may be configured such that (N–M) auxiliary punches (P3) selected from the N auxiliary punches (P3) perform, on the metal sheet (MS), nullification processing for nullifying the processing by (N–M) punches (P4) selected from the N punches (P4). The wording (N–M) is intended to subtract the M from the N, and may be described as the wording L, alternatively. According to the example, the metal sheet is processed by the punch unit including N punches as a set to form protrusions. That is, a processing position by the N punches is limited to one position in the longitudinal direction of the metal sheet. Therefore, the positional accuracy of the protrusions formed by the N punches increases, so that the protrusions are less likely to be displaced in the height direction of the rotor laminated iron core when the plurality of punched members are laminated. Further, according to the example, the punch unit for forming protrusion and the punches for the inner-shape blanking or outer-shape blanking are separate bodies. Therefore, even if one punch in the punch unit is damaged, it is not necessary to replace the punch for the inner-shape blanking or outer-shape blanking, and the maintainability of the device is improved. As a result, the laminated iron core can be manufactured with high accuracy and low cost.

Example 2

In the device (100) according to Example 1, the punch unit may be arranged at the downstream side from the N auxiliary punches (P3). In this case, first, the nullification processing by the (N–M) auxiliary punches is performed on the metal sheet, and then the protrusions are formed by the N punches on the metal sheet. Therefore, the punches do not contact the metal sheet at the location where the nullification processing is already performed. Therefore, as compared with the case where N protrusions are formed by the N punches and then (N–M) protrusions are subjected to the nullification processing (punching) by the (N–M) auxiliary punches, scraps are less likely to occur and burrs are less likely to be formed on the metal sheet. As a result, the laminated iron core can be formed with higher quality.

Example 3

In the device (100) according to Example 1 or Example 2, the punch unit may include six or eight punches (P4). According to the example, the device may include the same number of auxiliary punches as the number of punches included in the punch unit. Therefore, even if the number of the punches included in the punch unit increases, the number of the auxiliary punches does not exceed the number of the punches. Therefore, the configuration of the device is simplified, so that the manufacturing cost of the device can be reduced.

Example 4

The device (100) according to any one of Example 1 to Example 3 may further include an auxiliary punch unit including the N auxiliary punches (P3) as a set, and the N auxiliary punches (P3) may be individually operable. In this case, the N auxiliary punches are collectively configured as the auxiliary punch unit, so that it is not necessary to arrange the N auxiliary punches side by side along the longitudinal direction of the metal sheet. Therefore, the number of processes for the nullification processing is reduced. Therefore, a production time of the laminated iron core can be shortened, and the productivity can be improved.

Example 5

In the device (100) according to any one of Example 1 to Example 3, the N auxiliary punches (P3) may include one auxiliary punch (P3) arranged on the relatively upstream side of the metal sheet (MS), and another auxiliary punch (P3) arranged at the downstream side from the one auxiliary punch (P3) so as to perform the nullification processing on the metal sheet (MS) at a timing different from the one auxiliary punch (P3).

Example 6

In the device (100) according to any one of Example 1 to Example 5, the punch unit may include N dies (D42) respectively corresponding to the N punches (P4). In this case, the dies are also individualized, so that even if a predetermined die is damaged when forming the protrusion, only the damaged die needs to be replaced. Therefore, the maintainability of the device is further improved, and the laminated iron core can be manufactured at a lower cost.

Example 7

The device (100) according to any one of Example 1 to Example 6 may further include a drive mechanism (D64) configured to laminate the plurality of punched members (W) punched out from the metal sheet (MS) while being rotated such that the protrusions (Wb) overlap with each other in the height direction.

Example 8

An example of a method for manufacturing a laminated iron core (2, 10) may include punching out a plurality of punched members (W) having an annular shape and having M (M being a natural number of 1 or more) protrusions (Wb) provided on an inner peripheral edge or an outer peripheral edge thereof from a metal sheet (MS), and laminating the plurality of punched members while being rotated. The example of the method for manufacturing the laminated iron core (2, 10) may further include processing the metal sheet (MS) by a punch unit for forming protrusion including N (N being a natural number larger than M) punches (P4) as a set, and performing nullification processing on the metal sheet (MS) by (N–M) auxiliary punches (P3) selected from N auxiliary punches (P3) so as to nullify the processing by (N–M) punches (P4) among the N punches (P4). In this case, the same effects as the device according to Example 1 can be obtained.

Example 9

In the method according to Example 8, the processing on the metal sheet (MS) by the punch unit may be performed after the nullification processing on the metal sheet (MS) by the (N–M) auxiliary punches (P3). In this case, the same effects as the device according to Example 2 can be obtained.

Example 10

In the method according to Example 8 or Example 9, the punch unit may include six or eight punches (P4). In this case, the same effects as the device according to Example 3 can be obtained.

Example 11

In the method according to any one of Example 8 to Example 10, the N auxiliary punches (P3) may be grouped in a set as an auxiliary punch unit, and the N auxiliary punches (P3) may be individually operable. In this case, the same effects as the device according to Example 4 can be obtained.

Example 12

In the method according to any one of Example 8 to Example 10, the N auxiliary punches (P3) may include one auxiliary punch (P3) arranged on the relatively upstream side of the metal sheet (MS), and another auxiliary punch (P3) arranged at the downstream side from the one auxiliary punch (P3) so as to perform the nullification processing on the metal sheet (MS) at a timing different from the one auxiliary punch (P3). In this case, the same effects as the device according to Example 7 can be obtained.

Example 13

In the method according to any one of Example 8 to Example 12, the punch unit may include N dies (D42) respectively corresponding to the N punches (P4). In this case, the same effects as the device according to Example 5 can be obtained.

Example 14

The method according to any one of Example 8 to Example 13 may further include laminating the plurality of punched members (W) punched out from the metal sheet (MS) while being rotated such that the protrusions (Wb) overlap with each other in the height direction. In this case, the same effects as the device according to Example 6 can be obtained.

What is claimed is:

1. A device for manufacturing a laminated iron core by punching out a plurality of punched members from a metal sheet and laminating the plurality of punched members while being rotated, the plurality of punched members having an annular shape and having M number of protrusions provided on an inner peripheral edge or an outer peripheral edge of the plurality of punched members, the M being a natural number of 1 or more, the device comprising:
   a punch unit configured to form the protrusions, and including punches in an amount of N number as a set, the N being the natural number larger than the M;
   auxiliary punches in the amount of N number,
      wherein the N number of auxiliary punches are configured such that L number of auxiliary punches selected from the N number of auxiliary punches performs a nullification processing on the metal sheet, the nullification processing being configured to nullify a processing with the L number of punches among the N number of punches, the L being the natural number that is obtained by subtracting the M from the N; and a blanking punch that punches the metal sheet without punching the formed protrusions to perform a blanking process on the inner peripheral edge or the outer peripheral edge of the plurality of punched members.

2. The device according to claim 1,
wherein the punch unit is arranged at a downstream side from the N number of auxiliary punches.

3. The device according to claim 1, further comprising:
an auxiliary punch unit including the N number of auxiliary punches as a set,
wherein the N number of auxiliary punches are individually operable.

4. The device according to claim 1,
wherein the N number of auxiliary punches include:
   at least one auxiliary punch arranged at a relatively upstream side of the metal sheet; and
   another auxiliary punch arranged at a downstream side from the at least one auxiliary punch so as to perform the nullification processing on the metal sheet at a timing different from the at least one auxiliary punch.

5. The device according to claim 1, further comprising:
a drive mechanism configured to laminate the plurality of punched members punched out from the metal sheet while being rotated such that the protrusions overlap with each other in a height direction.

6. A method for manufacturing a laminated iron core by punching out a plurality of punched members from a metal sheet and laminating the plurality of punched members while being rotated, the plurality of punched members having an annular shape and having M number of protrusions provided on an inner peripheral edge or an outer peripheral edge of the plurality of punched members, the M being a natural number of 1 or more, the method comprising:
   processing the metal sheet with a punch unit of forming the protrusions, and including punches in an amount of N number as a set, the N being a natural number larger than the M;
   performing a nullification processing on the metal sheet with L number of auxiliary punches selected from auxiliary punches in the amount of N number so as to nullify a processing with the L number of punches among the N number of punches, the L being the natural number that is obtained by subtracting the M from the N; and
   performing a blanking process on the inner peripheral edge or the outer peripheral edge of the plurality of punched members by a blanking punch that punches the metal sheet without punching the formed protrusions.

7. The method according to claim 6,
wherein the processing on the metal sheet with the punch unit is performed after the performing of the nullification processing on the metal sheet with the L number of auxiliary punches.

8. The method according to claim 6,
wherein the N number of auxiliary punches are grouped in a set as an auxiliary punch unit, and
wherein the N number of auxiliary punches are individually operable.

9. The method according to claim 6,
wherein the N number of auxiliary punches include:
   at least one auxiliary punch arranged at a relatively upstream side of the metal sheet; and
   another auxiliary punch arranged at a downstream side from the at least one auxiliary punch so as to perform the nullification processing on the metal sheet at a timing different from the at least one auxiliary punch.

10. The method according to claim 6, further comprising:
laminating the plurality of punched members punched out from the metal sheet while being rotated such that the protrusions overlap with each other in a height direction.

* * * * *